(12) United States Patent
Aoki et al.

(10) Patent No.: US 7,603,043 B2
(45) Date of Patent: Oct. 13, 2009

(54) LIGHT RECEIVING ELEMENT CIRCUIT AND OPTICAL DISK DRIVE

(75) Inventors: Masahiro Aoki, Yamato (JP); Yasushi Higashiyama, Yokohama (JP); Masashi Ueno, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 476 days.

(21) Appl. No.: 11/485,221

(22) Filed: Jul. 12, 2006

(65) Prior Publication Data

US 2007/0014212 A1    Jan. 18, 2007

(30) Foreign Application Priority Data

Jul. 12, 2005 (JP) ............... 2005-203291
Nov. 29, 2005 (JP) ............... 2005-344228

(51) Int. Cl.
H04B 10/06 (2006.01)
(52) U.S. Cl. .............. 398/202; 398/207; 398/212
(58) Field of Classification Search ......... 398/140–142, 398/202–214
See application file for complete search history.

(56) References Cited

U.S. PATENT DOCUMENTS

| 5,287,340 | A | 2/1994 | Chapman |
| 5,881,035 | A | 3/1999 | Ueyama |
| 6,046,461 | A | 4/2000 | Saitoh et al. |
| 6,141,169 | A | 10/2000 | Pietruszynski et al. |
| 6,370,092 | B1 | 4/2002 | Araki |
| 6,466,528 | B1 | 10/2002 | Pietruszynski et al. |
| 6,580,670 | B2 | 6/2003 | Kim |
| 2001/0040850 | A1 | 11/2001 | Ma |
| 2003/0231574 | A1* | 12/2003 | Okuda et al. ........... 369/124.12 |
| 2004/0184387 | A1 | 9/2004 | Shirasaka |
| 2004/0257925 | A1 | 12/2004 | Lim |
| 2005/0117474 | A1* | 6/2005 | Ishikawa et al. ......... 369/44.35 |
| 2005/0122874 | A1* | 6/2005 | Watanabe et al. ........ 369/59.19 |

FOREIGN PATENT DOCUMENTS

| EP | 0 952 575 A2 | 10/1999 |
| JP | 6-37556 | 2/1994 |
| JP | 7-272303 | 10/1995 |
| JP | 2000-353925 | 12/2000 |
| JP | 2001-202646 | 7/2001 |
| JP | 2002-198748 | 12/2002 |
| JP | 2004-273680 | 9/2004 |
| JP | 2005-210147 | 8/2005 |

OTHER PUBLICATIONS

National Semiconductor, LMH6639 190MHz Rail-to-Rail Out put Amplifier with Disable, XP007907113, Dec. 2004, pp. 1-17.
Phillips Semiconductors, Photodiode and amplifier IC for CD and DVD applications, XP007907114, May 4, 2004, pp. 1-24.
European Search Report for 06117011.4 dated Feb. 17, 2009.

* cited by examiner

*Primary Examiner*—Dzung D Tran
(74) *Attorney, Agent, or Firm*—Knobbe, Martens, Olson & Bear, LLP

(57) ABSTRACT

According to one embodiment, a plurality of light receiving elements photoelectrically convert light signals having information signals, respectively. A plurality of first amplification circuits amplify currents of electric signals from the respective light receiving elements. A selecting section selectively outputs one of signals amplified by the plurality of first amplification circuits. A second amplification circuit amplifies a voltage of the signal output from the selecting section, and supplies the signal to the outside.

11 Claims, 20 Drawing Sheets

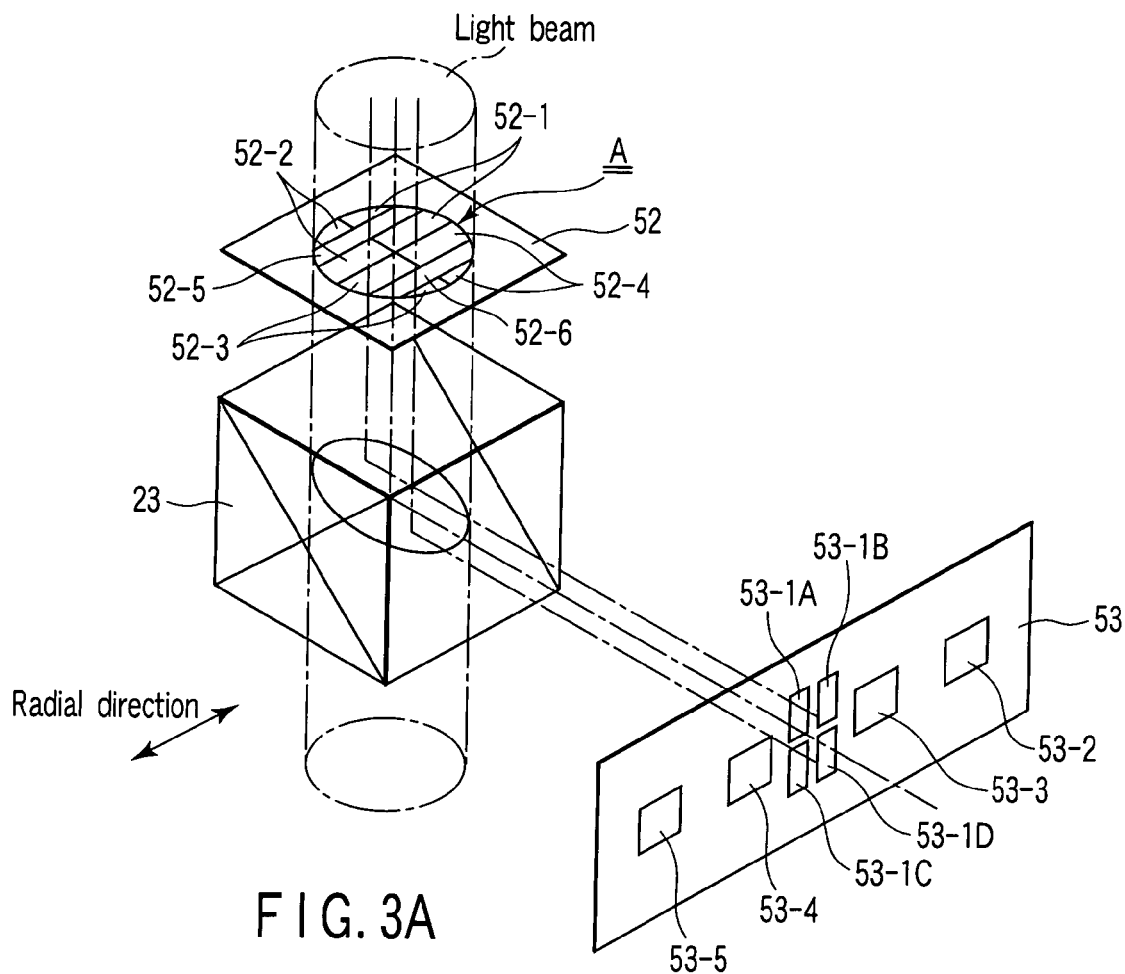
FIG. 3A
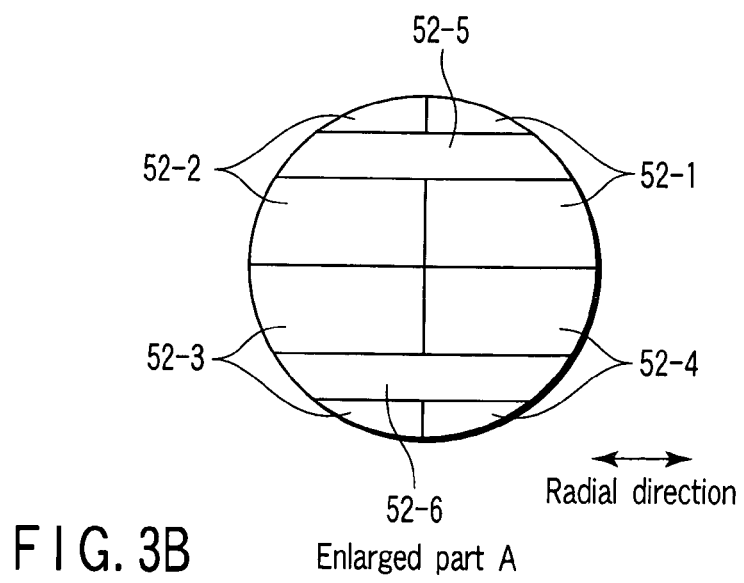
FIG. 3B  Enlarged part A

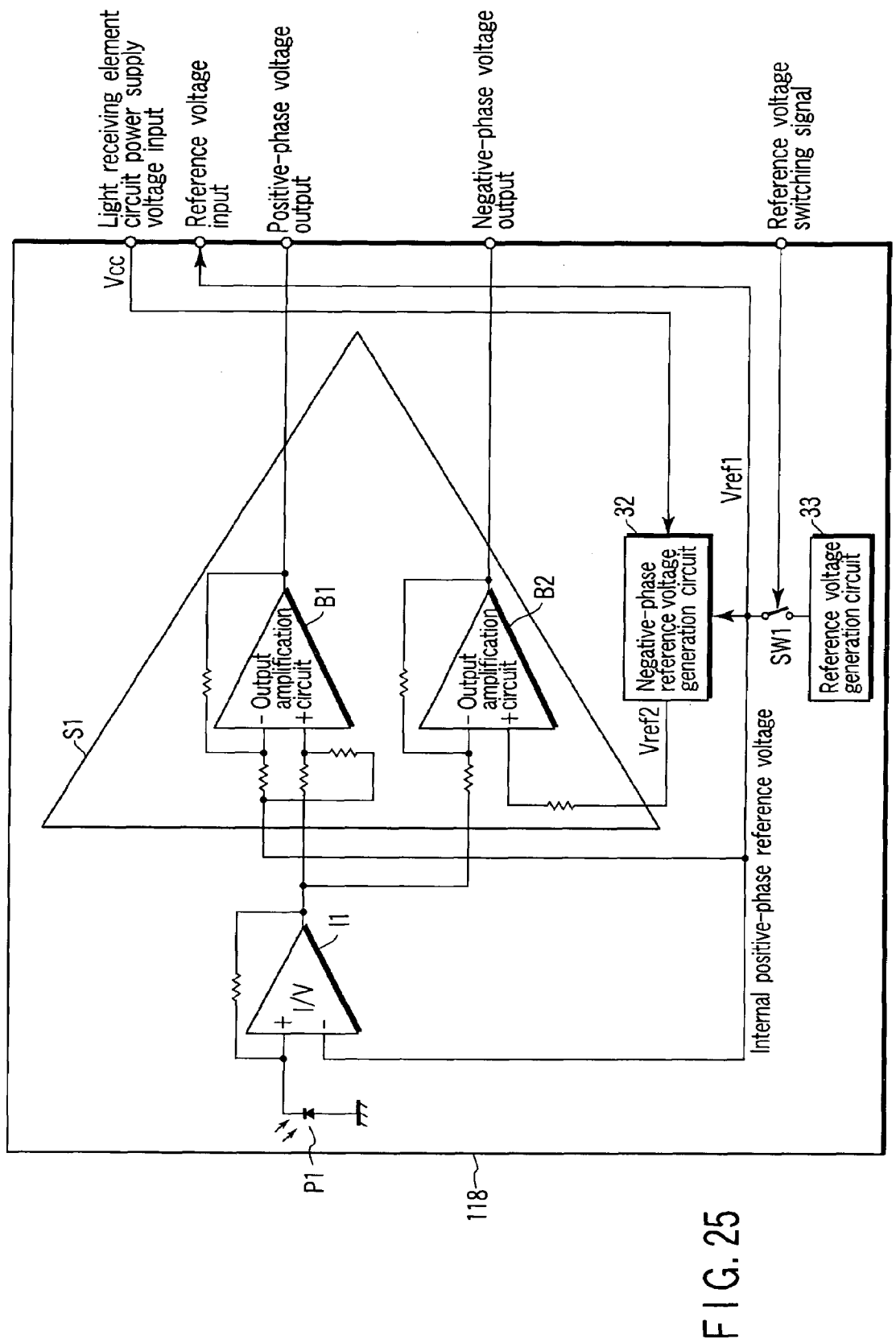
F I G. 25

LIGHT RECEIVING ELEMENT CIRCUIT AND OPTICAL DISK DRIVE

CROSS-REFERENCE TO RELATED APPLICATIONS

This application is based upon and claims the benefit of priority from Japanese Patent Applications No. 2005-203291, filed Jul. 12, 2005; and No. 2005-344228, filed Nov. 29, 2005, the entire contents of both of which are incorporated herein by reference.

BACKGROUND

1. Field

One embodiment of the invention relates to an optical disk drive which records information in an optical disk such as a DVD or a CD or which reproduces the information recorded in the optical disk, more particularly to a light receiving element circuit to be applied to an optical disk drive.

2. Description of the Related Art

In a case where information recorded in, for example, an optical disk is reproduced by a disk drive built in a personal computer or an optical disk drive such as a DVD recorder, a recording surface of the optical disk is irradiated with laser light from an optical pickup which moves in a radial direction of the optical disk. The laser light reflected on the recording surface is received by a light receiving element in a light receiving element circuit (in general, a semiconductor integrated circuit) disposed in an optical pickup to generate a photo detection signal. On the basis of this photo detection signal, laser light focusing, tracking and reproduction of information are performed.

In the light receiving element circuit, the reflected light from the optical disk recording surface is received by, for example, four divided light receiving elements. Each light receiving element photoelectrically converts the received reflected light to generate a current in accordance with intensity of the reflected light. This current is amplified by a current amplifier, further amplified by a voltage amplifier, and then supplied as the photo detection signal. In general, this photo detection signal is supplied to a signal processing unit fixed to the optical disk drive via a flexible cable such as a flat cable.

The signal processing unit generates servo signals such as a focusing control signal and a tracking control signal as well as an information reproduction signal based on the photo detection signal supplied from the optical pickup (light receiving element circuit). The servo signal generated by the signal processing unit is supplied to the optical pickup via the flat cable, and used for laser light focusing control and tracking control.

The flat cable for use in the optical pickup requires a large number of core wires such as a signal transmission line of the photo detection signal or the servo signal described above and a power supply line. In Jpn. Pat. Appln. KOKAI Publication No. 2004-273680 (FIG. 2), there is disclosed a technology to reduce the number of the core wires of the flat cable for use in the optical pickup.

In recent years, as to the optical disk drive, types of optical disk drives have increased in which a plurality of tracking systems are adopted in order to reproduce various types of optical disks such as a DVD-ROM and a DVD-RAM. In order to perform the focusing and the tracking correctly at a high speed with respect to an optical disk such as an HD DVD in which the recording is possible with a higher density than before, the light receiving element circuit is generalized in which the laser light is divided using a hologram (optical diffraction element), and the reflected light is received by a light receiving unit having more light receiving elements than before.

In a case where the reflected light is received by the light receiving unit adopting a plurality of tracking systems and having more light receiving elements than before in this manner, a circuit constitution of the light receiving element circuit becomes complicated, power consumption of the circuit increases, and the flat cable for signal transmission further requires more core wires. In recent years, the optical disk drive has been used in a video camera or a mobile product such as a car navigation system, and there is a strong demand for reduction of the power consumption and space saving.

Moreover, in recent years, with high densification of the disk, the optical disk drive requires a reduction in a read/write time of the information with respect to the disk, and an increase of a response speed of the drive. Therefore, in general, a constitution is adopted in which a high frequency (HF) signal output from the light receiving element circuit has a form of a positive-phase/negative-phase differential output signal. According to such constitution, the number of the core wires of the flat cable further increases.

In the form of the differential output signal, a positive-phase signal and a negative-phase signal are simultaneously output which have a reverse-phase relation to each other. In the signal processing unit which receives the signals, when a difference between the positive-phase signal and the negative-phase signal is generated, a signal amplitude is doubled to enlarge a dynamic range of the signal. Furthermore, there are removed in-phase noise components included in the positive-phase signal and the negative-phase signal. Therefore, transmission of the signal in the form of the differential output signal has an advantage that the transmission is resistant to noise.

On the other hand, with the increase of the speed, the power consumption of the disk drive increases. Therefore, there is a large problem that a heat rise in the disk drive increases, and yield of the disk drive and margins of performance decrease.

In general, the light receiving element circuit is configured to output an original signal of the servo signal generated in a signal processing circuit in addition to an HF signal. There are arranged several tens of light receiving elements at the most. This increases amplification elements, and also increases a scale of the circuit. This results in an increase of the power consumption of the light receiving element circuit itself.

In Jpn. Pat. Appln. KOKAI Publication No. 2002-198748, there is disclosed the light receiving element circuit of such differential signal output form. In this document, the light receiving element circuit is described in which a reference voltage of a positive-phase-signal-side amplifier and a reference voltage of a negative-phase-signal-side amplifier are generated from a reference voltage supplied from the outside of the light receiving element circuit, and the signal is output in a differential form.

In the light receiving element circuit of Jpn. Pat. Appln. KOKAI Publication No. 2002-198748 described above, as the reference voltages in a differential signal output form amplification circuit disposed for each light receiving element, three reference voltages are used which include: the reference voltage input from the outside; the positive-phase reference voltage generated in the circuit; and the reverse-phase reference voltage generated in the circuit. A voltage which is higher than the reference voltage input from the outside by a predetermined level is used as the reference voltage for the positive-phase signal, and a voltage which is lower than the reference voltage input from the outside by a predetermined level is used as the reference voltage for the negative-phase signal.

In such light receiving element circuit, the circuit constitution becomes complicated, and the dynamic range of the signal is easily broadly taken, but a consumed current increases as much as the range.

In recent years, several tens of light receiving elements are used in the light receiving element circuit, and the above-described amplification circuit of the differential signal output form is required for each light receiving element. Therefore, there is a strong demand for simplification of the signal amplification circuit and reduction of power consumption.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIGS. 3A and 3B are diagrams showing another example of the HOE incorporated in the optical head device shown in FIG. 1 and the light receiving element pattern which receives the light divided by the HOE;

FIG. 9 is a diagram showing a light receiving element circuit in which it is possible to switch gains of converting amplification circuits I1 to In;

FIG. 25 is a diagram showing still another embodiment of the light receiving element circuit having the differential output circuit.

DETAILED DESCRIPTION

Various embodiments according to the invention will be described hereinafter. In general, according to one embodiment of the invention, there is provided a light receiving element circuit comprises: a plurality of light receiving elements which photoelectrically convert light signals having information signals, respectively; a plurality of first amplification circuits which amplify electric signals from the light receiving elements, respectively; selecting means for selectively outputting one of the signals amplified by the plurality of first amplification circuits; and a second amplification circuit which amplifies the signal output by the selecting means and which supplies the signal to the outside.

Embodiments of the present invention now will be described with reference to the drawings.

Figure 1:
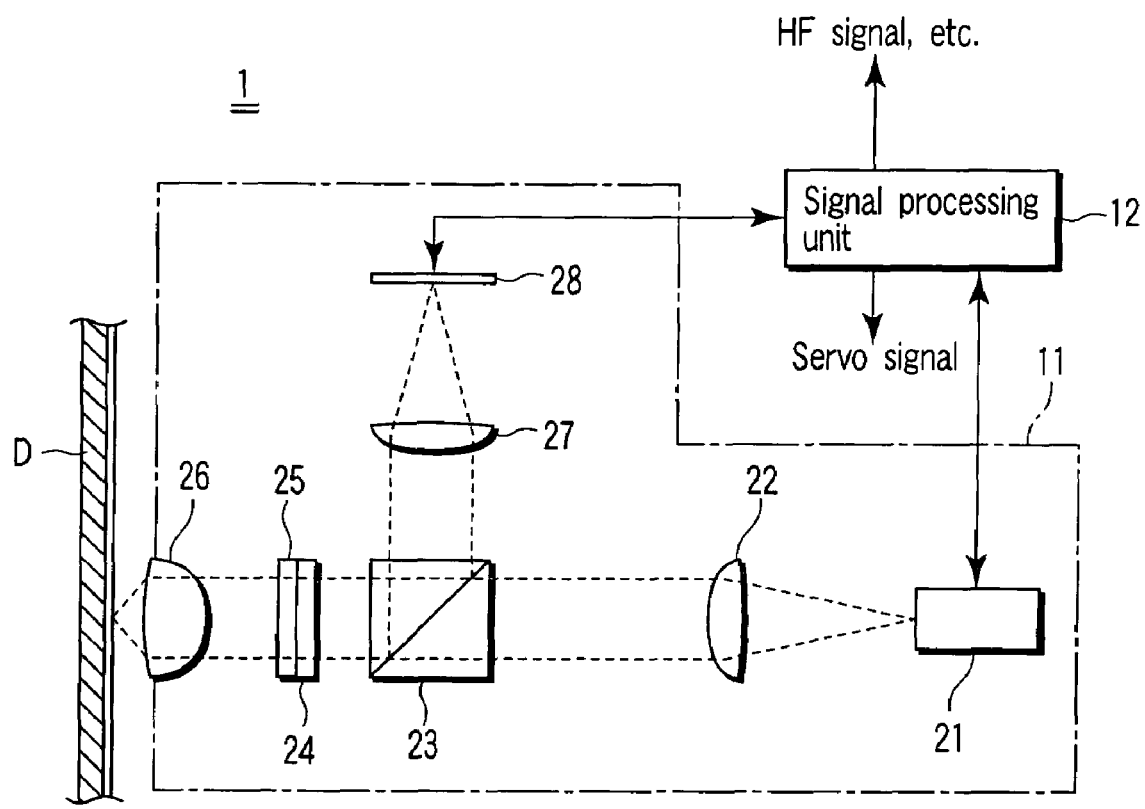
FIG. 1 is a diagram showing one example of an optical disk drive having an optical head device to which the present invention is applied.

FIG. 1 shows one example of an optical disk drive having an optical head device (optical pickup) 11 to which a light receiving element circuit of the present invention is applied.

An optical disk drive 1 shown in FIG. 1 converges laser light emitted from the optical head device 11 on an optical disk D to thereby record information in the optical disk D or reproduce the information recorded in the optical disk D.

The optical head device 11 includes a light source such as a semiconductor laser element or a laser diode (LD) 21 having a wavelength of 405 nm to 780 nm. The laser light output from the LD 21 is formed into parallel light by a collimating lens 22, and the light passes through a polymerization beam splitter (PBS) 23, a light dividing element (HOE) 24 and a λ/4 plate 25, and is converged on the optical disk D by an objective lens 26.

The laser light is converged on the optical disk to thereby reproduce information written into an optical disk surface or write information into the disk.

The reflected light from the optical disk D passes through the objective lens 26, and is incident on the PBS 23 from the λ/4 plate 25 and the HOE 24. A focus lens 27 allows the laser light reflected on the PBS 23 to be incident on a light receiving element circuit 28 provided with a detection region having a predetermined arrangement.

The light receiving element circuit 28 photoelectrically converts, current/voltage-converts and amplifies the incident light, and the light is output as a photo detection signal to a signal processing unit 12 in a subsequent stage of the optical head device 11. The signal processing unit 12 generates a servo signal such as a focus error signal or a tracking error signal, an HF signal or the like based on the photo detection signal from the optical head device 11. Based on the focus error signal, a focusing control circuit (not shown) controls focusing of the laser light emitted from the optical head device 11. Based on the tracking error signal, a tracking control circuit (not shown) controls tracking of the laser light emitted from the optical head device 11. A data reproduction circuit (not shown) reproduces data recorded in an optical disk based on the HF signal. Since these focusing control circuit, tracking control circuit and data reproduction circuit are known technologies, detailed description thereof is omitted.

Figure 2:
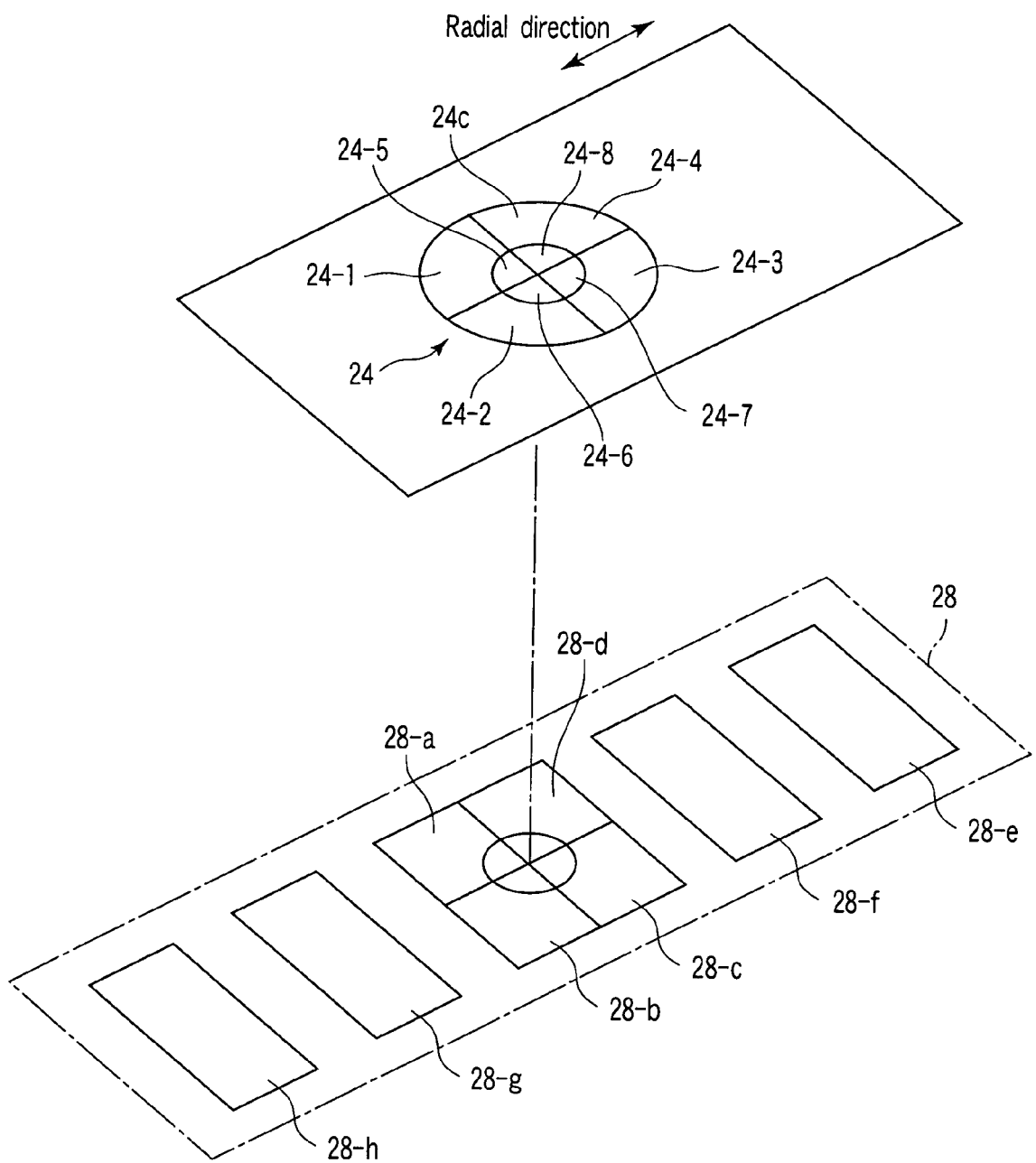
FIG. 2 is a diagram showing one example of an HOE incorporated in the optical head device shown in FIG. 1 and a light receiving element pattern which receives light divided by the HOE.

FIG. 2 shows one example of the HOE (holographic optical element) 24 to be incorporated in the optical head device 11 shown in FIG. 1 and a light receiving element pattern which receives light divided by the HOE 24 (24-1 to 24-8).

The laser light (laser beam) divided by the HOE 24 is formed into images on four light receiving elements 28-*a* to 28-*d* arranged in the center of the light receiving element circuit 28 and four light receiving elements 28-*e* to 28-*h* arranged at intervals in a radial direction (optical disk radius direction).

That is, the laser light (diffracted light) diffracted by the diffraction pattern 24-1 is formed into an image on the light receiving element 28-*h*, the laser light diffracted by the pattern 24-2 is formed into an image on the light receiving element 28-*g*, the laser light diffracted by the pattern 24-3 is formed into an image on the light receiving element 28-*f*, and the laser light diffracted by the pattern 24-4 is formed into an image on the light receiving element 28-*e*, respectively.

Moreover, the laser light diffracted by the diffraction pattern 24-5 is formed into an image on the light receiving element 28-*a*, the laser light diffracted by the pattern 24-6 is formed into an image on the light receiving element 28-*b*, the laser light diffracted by the pattern 24-7 is formed into an image on the light receiving element 28-*c*, and the laser light diffracted by the pattern 24-8 is formed into an image on the light receiving element 28-*d*, respectively.

Each diffracted light diffracted by all of the regions 24-1 to 24-8 of the HOE 24 is utilized in detection of a differential phase detection (DPD) system tracking error signal in conformity with a DPD system. The diffracted light diffracted by the regions 24-1 to 24-4 is utilized in generation of a push pull (PP) system tracking error signal in conformity with a PP system.

FIG. 3 shows another example of the HOE 24 to be incorporated in the optical head device 11 shown in FIG. 1 and the light receiving element pattern which receives the light divided by the HOE 24.

That is, an HOE 52 (52-1 to 52-6) shown in FIG. 3 obtains the focus error signal by use of the regions 52-5 and 52-6 secured linearly with respect to the radial direction (radius direction) of the optical disk. The regions 52-1 to 52-4 are regions for obtaining the tracking error signal, and the laser light transmitted through these regions is diffracted at different angles, respectively.

The regions 52-1 to 52-4 are formed so that the laser light which has passed through each region can be formed into images on light receiving elements 53-2 to 53-5, respectively. It is to be noted that the light which has passed through the region 52-1 is formed into an image on the light receiving element 53-2, the light which has passed through the region 52-2 is formed into an image on the element 53-5, the light which has passed through the region 52-3 is formed into an image on the element 53-4, and the light which has passed through the region 52-4 is formed into an image on the element 53-3.

FIRST EMBODIMENT

In the following description, a "converting amplification circuit" includes a current amplification and current voltage converting amplification circuit.

Figure 4:
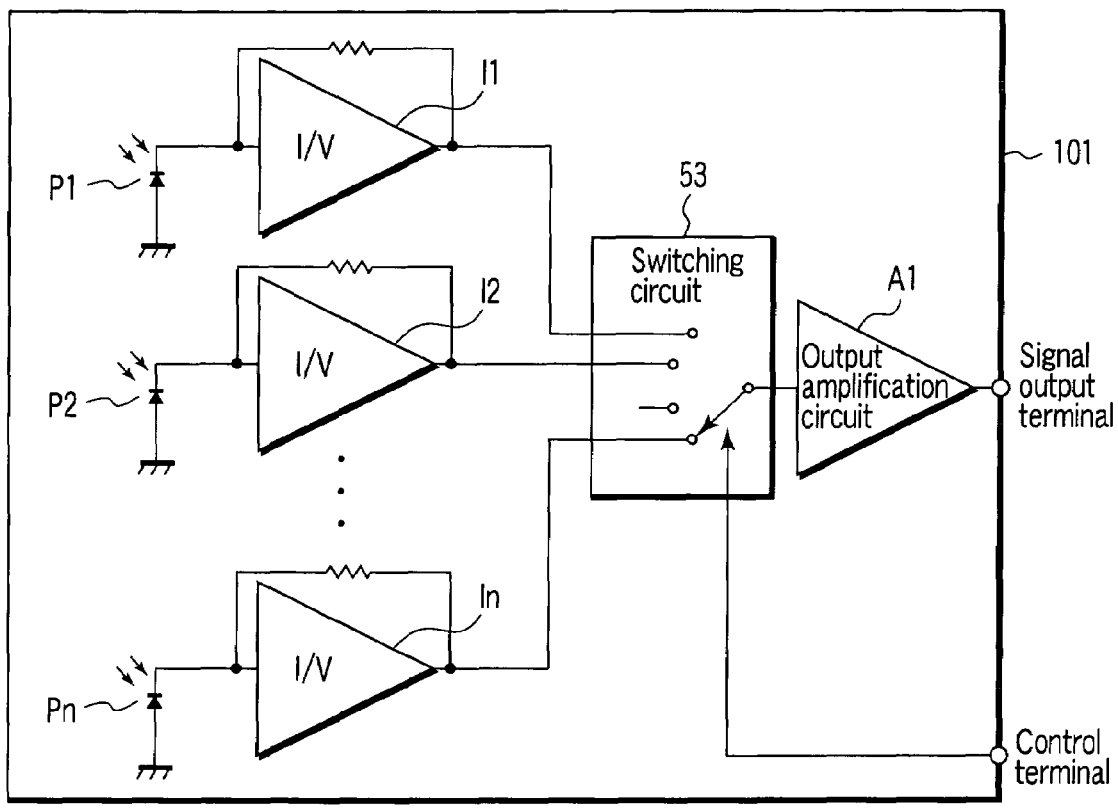
FIG. 4 is a diagram showing a light receiving element circuit of the present invention.

FIG. 4 is a diagram showing a light receiving element circuit 101 (corresponding to the light receiving element circuit 28 of FIG. 1) in a first embodiment of the present invention. Reflected light from a disk D is incident on a plurality of light receiving elements P1 to Pn, and is converted into a current. The current is amplified and converted into a voltage by converting amplification circuits (I/V) I1 to In. The voltage is amplified and output by an output amplification circuit A1.

Output signals of the converting amplification circuits I1 to In are connected to a switching circuit 53, and one output signal is selected by the switching circuit 53, and output to the outside via the output amplification circuit A1.

With respect to the output amplification circuit A1, a combination of the light receiving element and the converting amplification circuit from which the output signal is to be selected is determined by a control signal supplied from a control terminal to the switching circuit 53.

In the present embodiment, instead of setting, to 1:1, a relation between the number of the light receiving elements and the number of the output amplification circuits, one of a plurality of light receiving elements is connected to the output amplification circuit by the switching circuit 53, or the output amplification circuits less than the light receiving elements are arranged for the plurality of light receiving elements. This makes possible reduction of power consumption, space saving, miniaturization, simplification and reduction of IC terminals in the light receiving element circuit.

Moreover, as the derivative result, a pickup circuit is simplified, and output signal lines (terminals) from a pickup circuit side including the light receiving element circuit are reduced. The reduction of the power consumption extends life of a power supply of an optical head device and an optical disk drive.

SECOND EMBODIMENT

Figure 5:
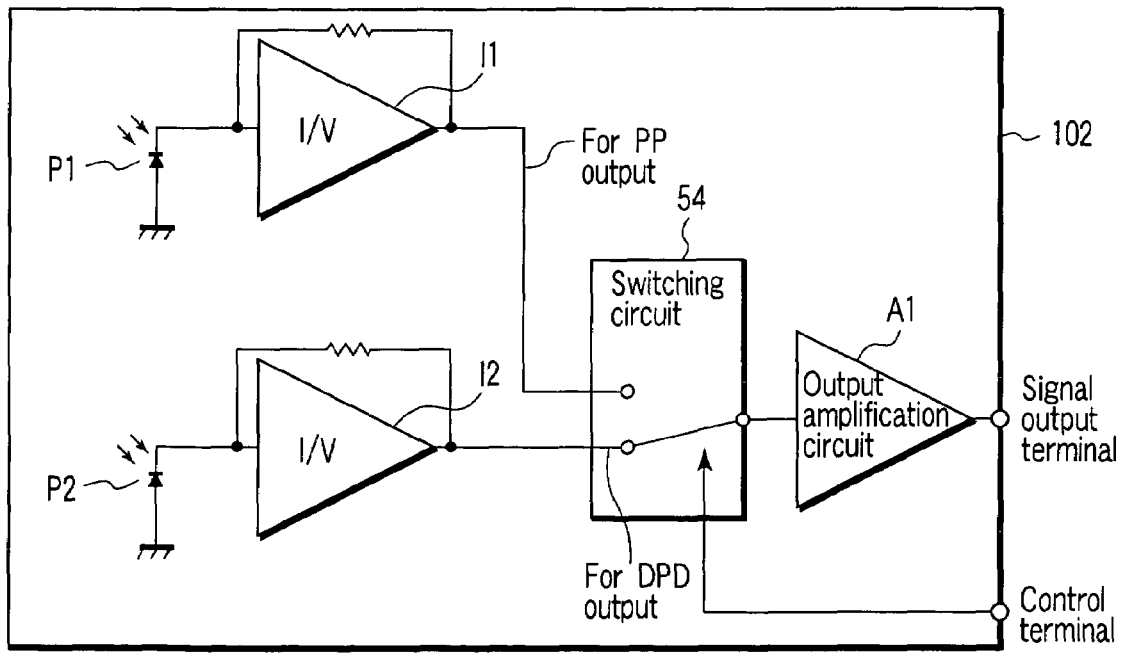
FIG. 5 is a diagram showing a light receiving element circuit including a switching circuit which switches an output signal for generating a DPD system tracking signal and an output signal for generating a PP system tracking signal.

FIG. 5 is a diagram showing a light receiving element circuit 102 including a switching circuit 54 which switches an output signal for generating a DPD system tracking signal (DPD signal) and an output signal for generating a PP system tracking signal (PP signal) in a second embodiment of the present invention.

For example, a light signal which has been incident on a light receiving element P1 is a light signal required for generating the PP signal, and a light signal which has been incident on a light receiving element P2 is a light signal required for generating the DPD signal. The light signals which have been incident on the light receiving elements P1, P2 are converted into currents, respectively, and the currents are converted into voltages by converting amplification circuits I1 and I2, respectively. The switching circuit 54 selects one voltage signal from a voltage signal required for generating the PP signal and a voltage signal required for generating the DPD signal, and the selected signal is output from an output amplification circuit A1.

Figure 6:
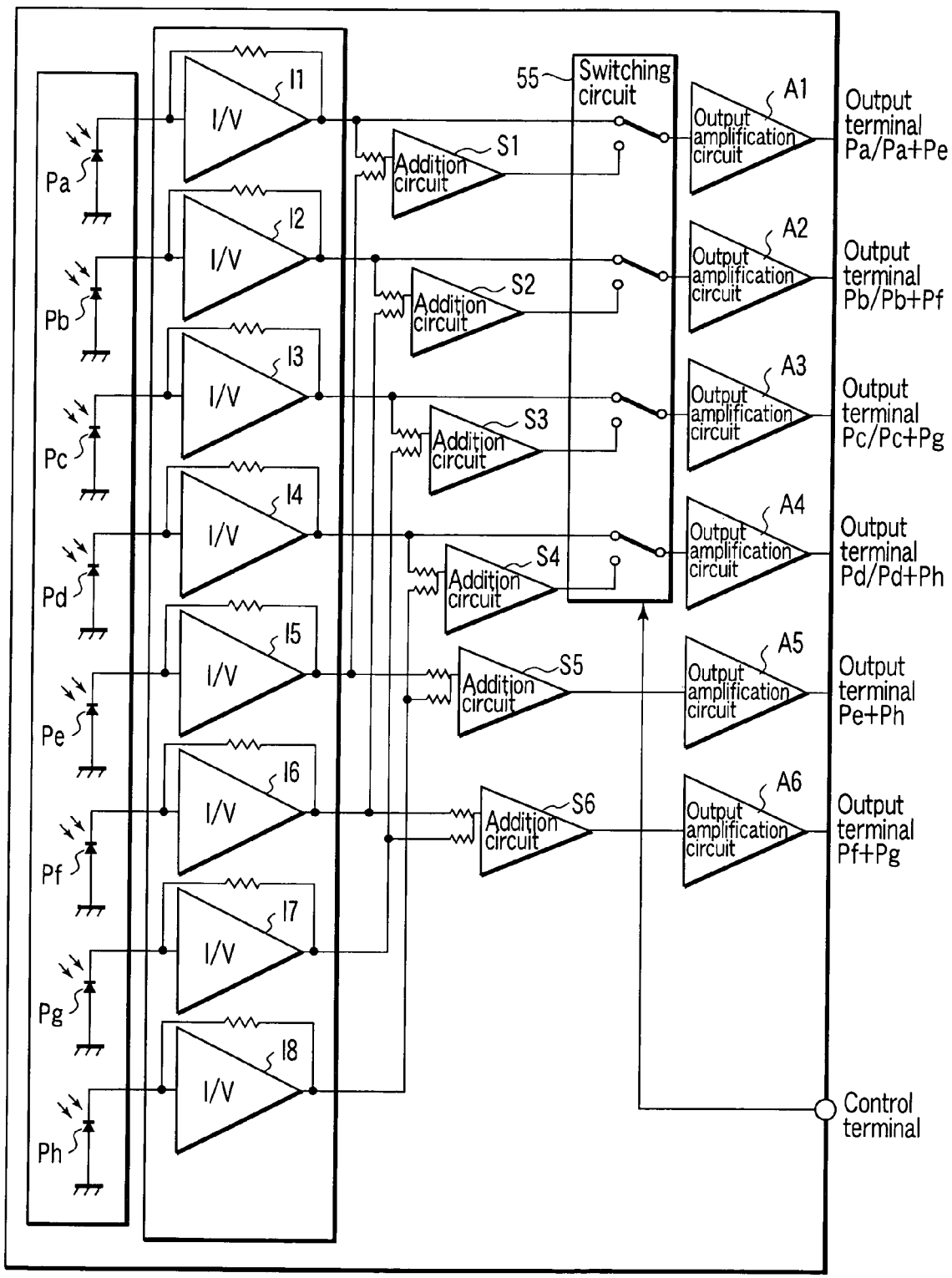
FIG. 6 is a diagram showing a specific example of switching of a PP output and a DPD output of a tracking system.

FIG. 6 shows a specific example of switching of a PP output and a DPD output of a tracking system. In FIG. 6, light receiving elements Pa, Pb, Pc, Pd, Pe, Pf, Pg and Ph, converting amplification circuits I1 to I8 and output amplification circuits A1 to A6 correspond to a light receiving element P1, P2 part, a converting amplification circuit I1, I2 part and the output amplification circuit A1 of FIG. 5, respectively. The light receiving elements Pa, Pb, Pc, Pd, Pe, Pf, Pg and Ph of FIG. 6 correspond to the light receiving elements 28-f, 28-g, 28-h, 28-e, 28-a, 28-d, 28-c and 28-b in the light receiving region of FIG. 2, respectively.

In the light receiving element circuit 28 of FIG. 2, assuming that output values of the light receiving elements Pa to Ph are Pa to Ph in the circuit of FIG. 6, the PP output of the tracking signal is obtained by the following:

$$PP=(Pa+Pd)-(Pb+Pc).$$

Moreover, in the circuit of FIG. 6, the DPD output is obtained by the following:

$$DPD=pha(Pa+Pe+Pc+Pg)-pha(Pb+Pf+Pd+Ph),$$

wherein pha indicates that a phase of each output value is taken.

In this manner, since a calculating equation of the PP output is generally different from that of the DPD output, a switching circuit 55 of FIG. 6 switches signals to be input into the output amplification circuits A1 to A4.

As to the PP output, in FIG. 6, a switch is changed to an output side of the converting amplification circuit I1 in response to a signal from a control terminal so that an output signal Pa is output to an output terminal Pa/Pa+Pe. Similarly, the switch is simultaneously changed to output sides of the converting amplification circuits I2 to I4 in response to the signal from the control terminal so that output signals of output terminals Pb/Pb+Pf, Pc/Pc+Pg and Pd/Pd+Ph are Pb, Pc and Pd, respectively.

As to the DPD output, in FIG. 6, the switch is changed to an output side of an addition circuit S1 which adds up output signals of the converting amplification circuits I1 and I5 in response to the signal from the control terminal so that an output signal Pa+Pe is output to the output terminal Pa/Pa+Pe. Similarly, the switch is simultaneously changed to output sides of addition circuits S2 to S4 which add up output signals of the converting amplification circuits I2 to I4 and I6 to I8 in response to the signal from the control terminal so that the output signals of the output terminals Pb/Pb+Pf, Pc/Pc+Pg and Pd/Pd+Ph are Pb+Pf, Pc+Pg and Pd+Ph, respectively.

When the switching of the PP output and the DPD output is performed, terminals do not have to be disposed as many as the output signals, respectively. As a result, space saving, miniaturization, simplification and reduction of wiring lines are possible. As the derivative result, a circuit as an optical head device is simplified.

THIRD EMBODIMENT

Figure 7:
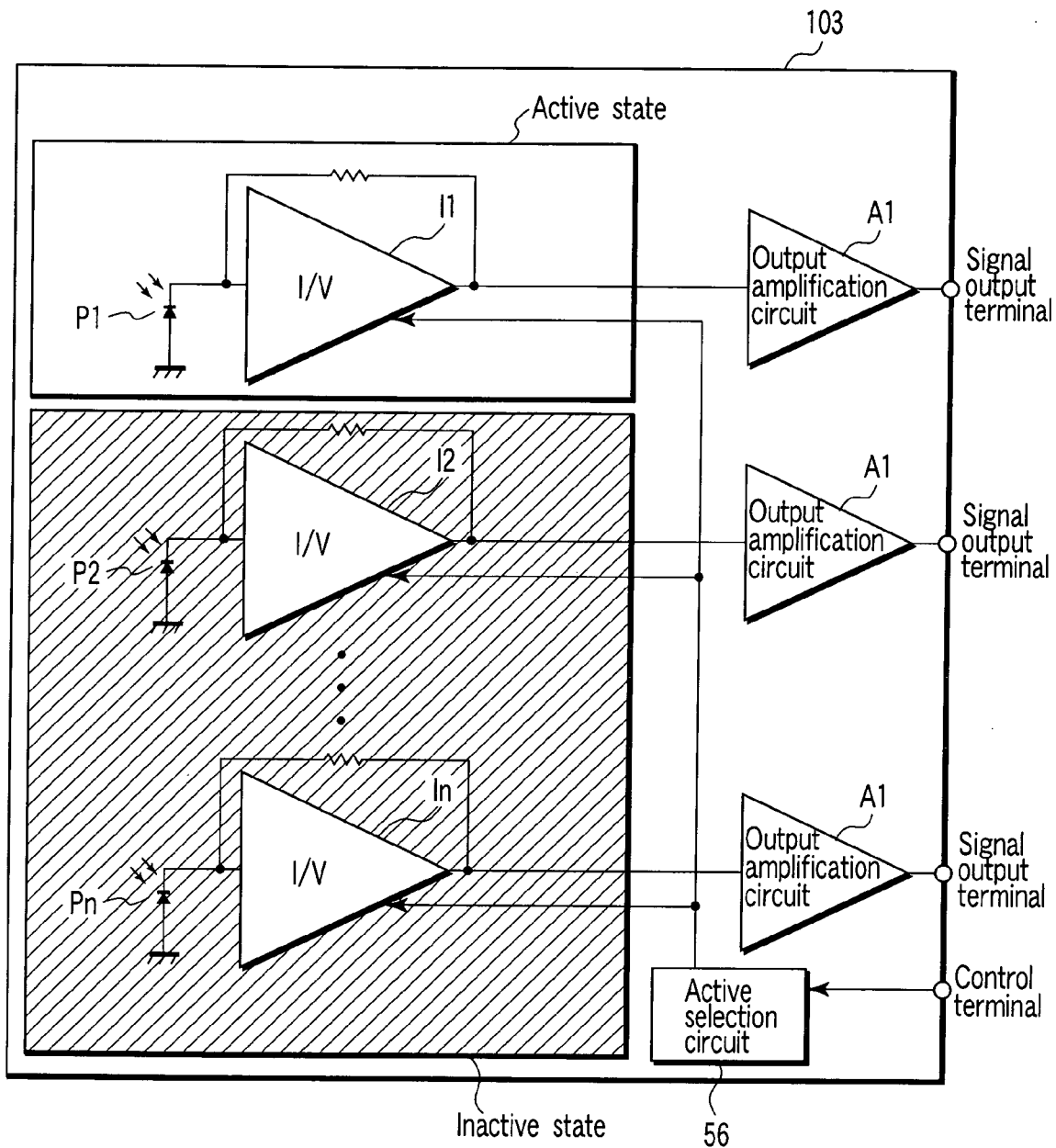
FIG. 7 is a diagram showing a light receiving element circuit including an active selection circuit which selects an active state or an inactive state of the circuit.

FIG. 7 is a diagram showing a constitution of a light receiving element circuit 103 including an active selection circuit which selects an active state or an inactive state of the circuit in a third embodiment of the present invention.

In a case where an only signal of light which is incident on a light receiving element P1 is required as information, and light signals which are incident on other light receiving elements P2 to Pn are not required, an active selection circuit 56 is controlled in response to a control signal from the outside, the light receiving element P1 and a converting amplification circuit I1 are brought into an active state, and light receiving elements P2 to Pn and converting amplification circuits I2 to In are brought into an inactive state.

FIG. 7 shows an example in which the only signal of light which is incident on the light receiving element P1 is required as the information. However, in a case where the light signals which enter the other light receiving elements P2 to Pn are required, a circuit section for use is brought into the active state, and a circuit section which does not require any light signal is brought into the inactive state.

Figure 8:
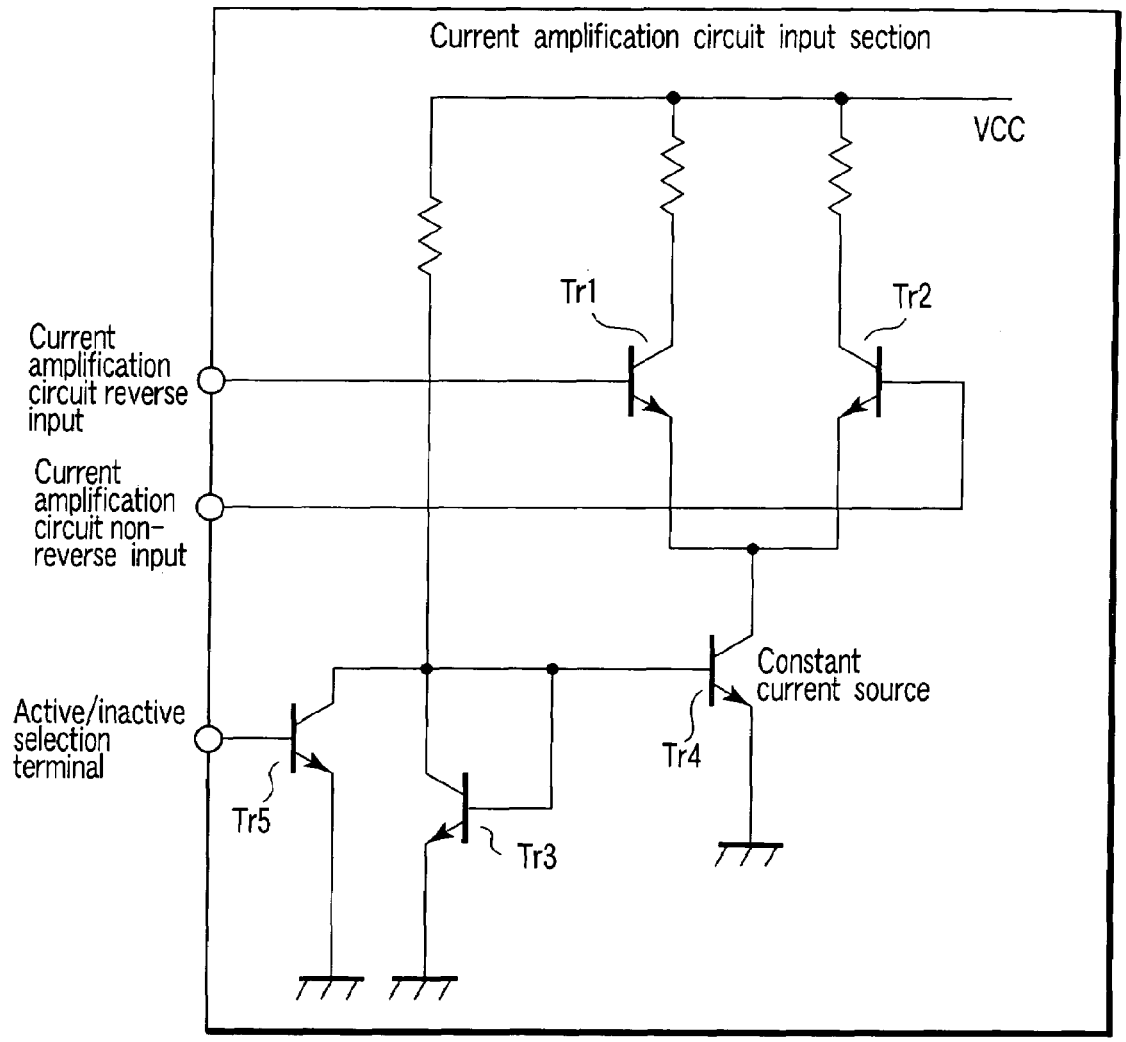
FIG. 8 is a diagram showing a specific example in which a converting amplification circuit is brought into an active state or an inactive state.

FIG. 8 shows a specific example in which the converting amplification circuit is brought into the active state or the inactive state. FIG. 8 shows an only internal input section of one of the converting amplification circuits I1 to In of FIG. 7, and all input stages of the converting amplification circuits I1 to In have the same internal constitution.

Transistors Tr1, Tr2 form a differential amplifying section of a non-inverting input and an inverting input of the converting amplification circuit (for simplicity, FIG. 7 shows only one input terminal). Transistors Tr3, Tr4 form a current mirror, and constitute a constant current source of the differential amplifying section including the transistors Tr1 and Tr2. A base of a transistor Tr5 is an active/inactive selection terminal input, and connected to the active selection circuit 56. When an ON voltage is applied to the active/inactive selection terminal input, and the transistor Tr5 is turned on, the transistor Tr3 is brought into an OFF state. Accordingly, no current flows between a collector and an emitter of the transistor Tr4, and the transistors Tr1, Tr2 also turn off. As a result, the converting amplification circuit is brought into the inactive state.

Conversely, to bring the circuit into the active state, when an active/inactive selection terminal potential is set to GND, the transistor Tr5 turns off. This brings the transistor Tr3 into an ON state, and a current flows from VCC through a resistor. Accordingly, through the transistor Tr4, a current flows which is equivalent to the current flowing between the collector and the emitter of the transistor Tr3. Therefore, the transistors Tr1, Tr2 are brought into the ON state. As a result, the converting amplification circuit is brought into the active state.

When the control signal is input from the active selection circuit into an active/inactive input terminal of each of the converting amplification circuits I1 to In as described above, the converting amplification circuit to be brought into the active state or the inactive state is determined.

According to this third embodiment, control of the active selection circuit 56 brings, into the inactive state, the light receiving element and the converting amplification circuit which are not used. Accordingly, a switching circuit shown in FIG. 4 is not required, it is possible to achieve simplification of the circuit, reduction of terminals of the light receiving element circuit, reduction of components and reduction of power consumption due to the simplification and the reductions, and it is further possible to inhibit excessive heat generation of the light receiving element circuit itself. As the derivative result, an amount of heat to be generated in the whole pickup circuit is reduced, and an operation stability of an optical head device enhances.

FOURTH EMBODIMENT

Figure 9:
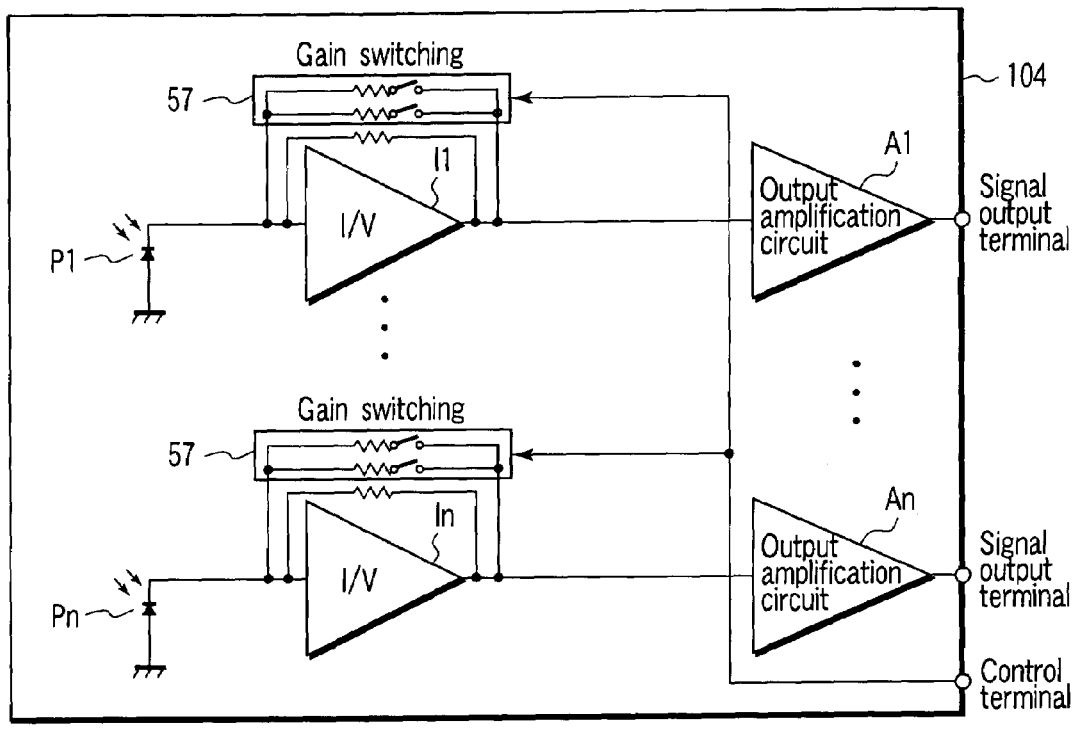

FIG. 9 is a diagram showing a constitution of a light receiving element circuit 104 in which gains of converting amplification circuits I1 to In can be switched in a fourth embodiment of the present invention. The fourth embodiment of the light receiving element circuit is shown. In accordance with magnitudes of light signals incident on light receiving elements P1 to Pn, the gains of the converting amplification circuits I1 to In can be switched by a gain switching section 57 in response to a control signal from a control terminal.

When a gain switching function is disposed in this manner, it is possible to set the gain in accordance with the magnitude of the light signal incident on a light receiving element. As the derivative result, it is possible to prevent saturation of an output of the light receiving element circuit or acquire a required voltage level.

FIFTH EMBODIMENT

Figure 10:
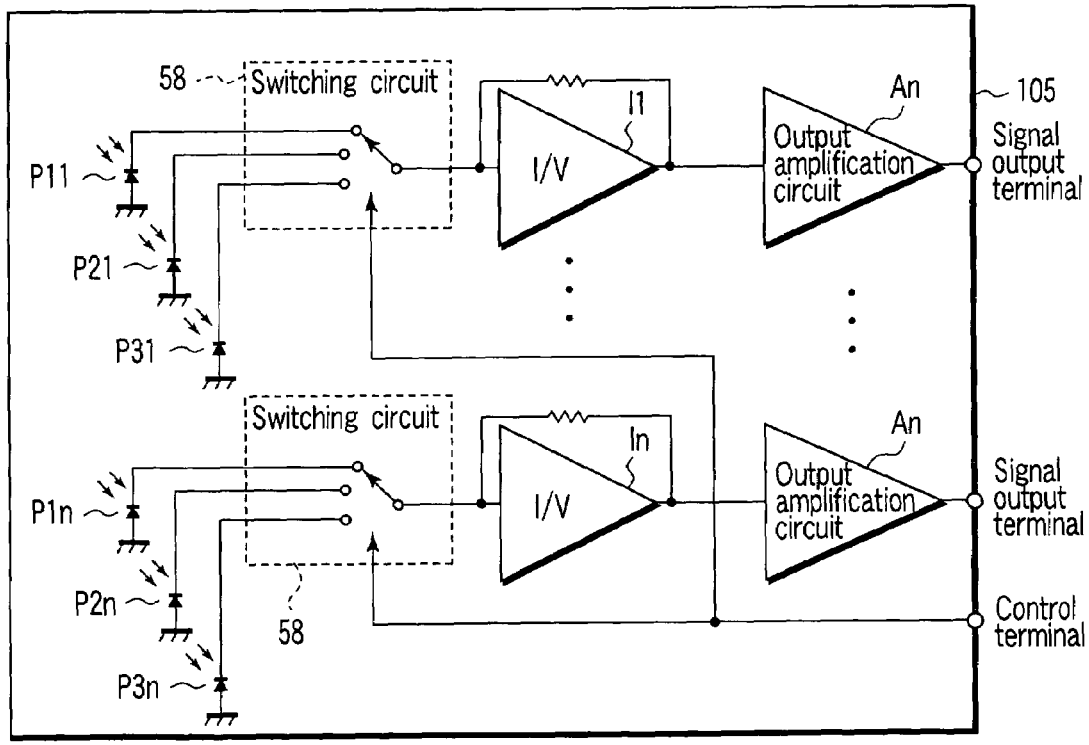
FIG. 10 is a diagram showing a circuit which controls a switching circuit in response to a control signal from a control terminal to switch a plurality of light receiving elements P11 to P1n, P21 to P2n and P31 to P3n.

FIG. 10 is a diagram showing a constitution of a light receiving element circuit 105 in a fifth embodiment of the present invention. The light receiving element circuit 105 controls a switching circuit 58 in response to a control signal from a control terminal to switch a plurality of light receiving elements P11 to P1n, P21 to P2n and P31 to P3n which photoelectrically convert light signals having information signals and mutually different wavelengths. The light receiving elements P11 to P1n, P21 to P2n and P31 to P3n constitute light receiving element groups corresponding to the different wavelengths, respectively.

For example, it is assumed that the light receiving element group which meets an HD DVD includes the elements P11 to P1n, the light receiving element group which meets a DVD includes the elements P21 to P2n, and the light receiving element group which meets a CD includes the elements P31 to P3n. The light receiving elements P11, P21 and P31 are connected to a converting amplification circuit I1 through the switching circuit 58 having the control terminal. The other light receiving elements are similarly connected to the converting amplification circuit.

When a power supply is turned on in the optical disk drive of FIG. 1, or the drive is restarted, control of a signal processing unit 12 allows an LD 21 of the HD DVD or the DVD to emit light. In a case where a lead-in area of a disk D is accessed, when the loaded optical disk is the HD DVD, all of the switching circuits are switched to the side of the group of light receiving elements I11 to I1n for the HD DVD in response to the control signal from the control terminal. When the loaded disk is the DVD, all of the circuits are switched to the side of the group of light receiving elements I21 to I2n for the DVD. When the loaded disk is the CD, all of the circuits are switched to the side of the group of light receiving elements I31 to I3n for the CD.

As described above, according to the fifth embodiment, since the light receiving element can be selected in accordance with the wavelength, the converting amplification circuit can be shared.

SIXTH EMBODIMENT

Figure 11:
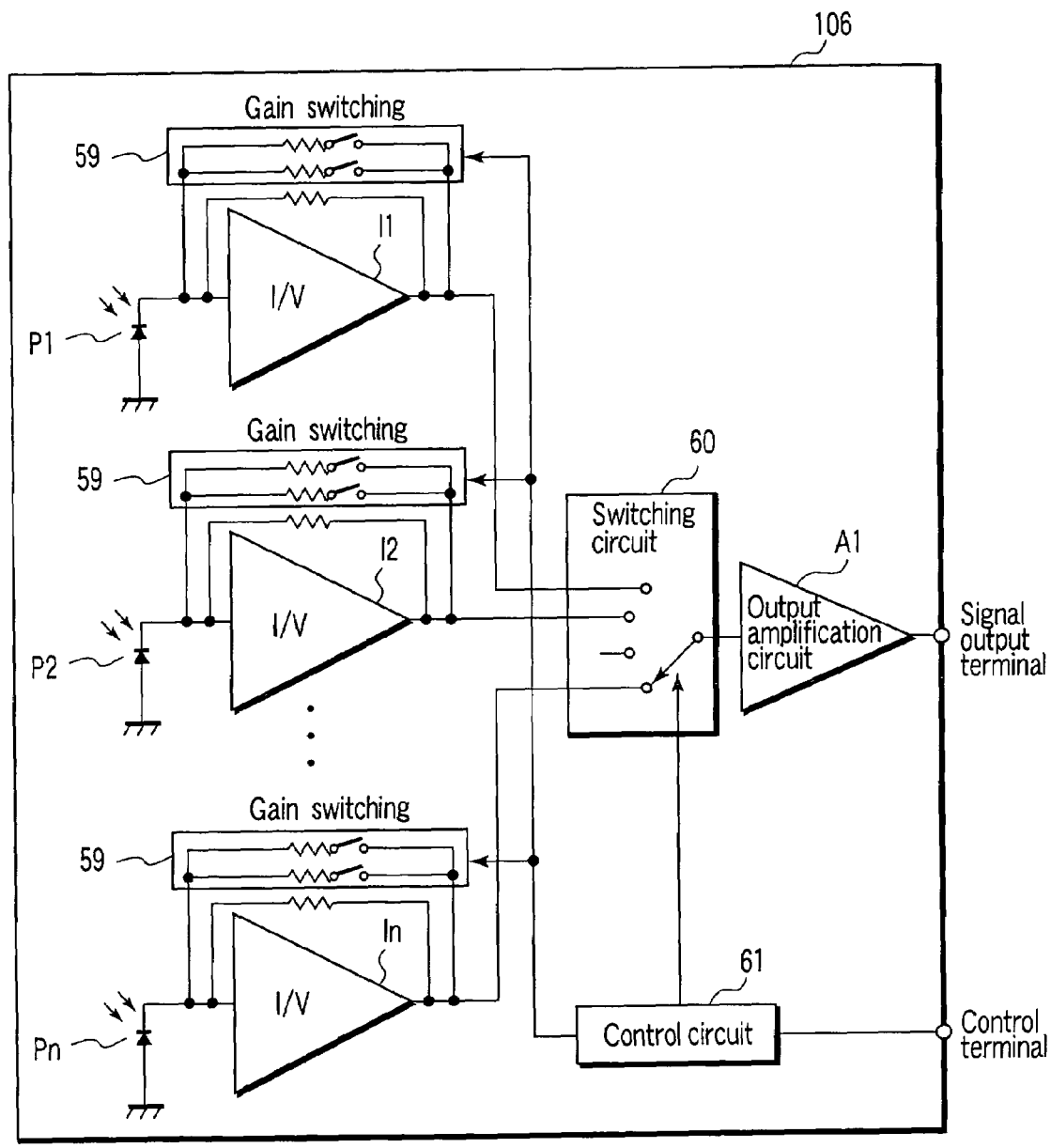
FIG. 11 is a diagram showing a light receiving element circuit which simultaneously performs switching of converting amplification circuits I1 to In and gain switching of converting amplification circuits.

FIG. 11 is a diagram showing a constitution of a light receiving element circuit 106 which simultaneously performs switching of converting amplification circuits I1 to In and gain switching of the converting amplification circuit in a sixth embodiment of the present invention. A control signal input into a control terminal is sent to both of a gain switching circuit 59 and an output switching circuit 60 by a control circuit 61. Accordingly, it is possible to select one of outputs of the converting amplification circuits while a specific gain is set.

As described above, the gain of each converting amplification circuit can be changed to a desired value. Furthermore, a plurality of converting amplification circuits can share an output amplification circuit A1. Therefore, it is possible to achieve space saving, miniaturization, simplification and reduction of wiring lines. As the derivative result, the circuit is simplified as an optical head device.

SEVENTH EMBODIMENT

In a case where a signal detection system of a disk differs, and further a calculating equation of the detection system differs in the switching circuit of FIGS. 5 and 6, in a seventh embodiment, default setting of the detection system at a time when a power supply of a drive (optical disk drive) is turned on is performed to obtain a certain predetermined system.

For example, in an optical disk drive which can handle mutually different tracking systems such as a PP system and a DPD system and which includes the switching circuit shown in FIG. 6, the switching circuit is set beforehand so that an output signal of a light receiving element is a DPD system output signal at a time when the power supply is turned on or in a case where the power supply of the drive is turned on again such as a case where the power supply of an optical head device is turned on again. An output of a light receiving element circuit is set to a DPD output in a case where the optical head device or the optical disk drive is restarted.

When the drive is started regardless of a type of the optical disk loaded in the drive, when the power supply of the system turns off and the drive is started again or when the system is restarted, a system lead-in area is surely first read. Therefore, the DPD tracking system required at the time is used as a default system in setting the switching circuit.

As described above, a tracking output of the light receiving element circuit is set beforehand to the DPD output at a time when the power supply of the optical disk drive is turned on. In consequence, a time for switching the tracking output of the light receiving element circuit is shortened, and a time for starting the optical disk drive is shortened.

EIGHTH EMBODIMENT

Figure 12:
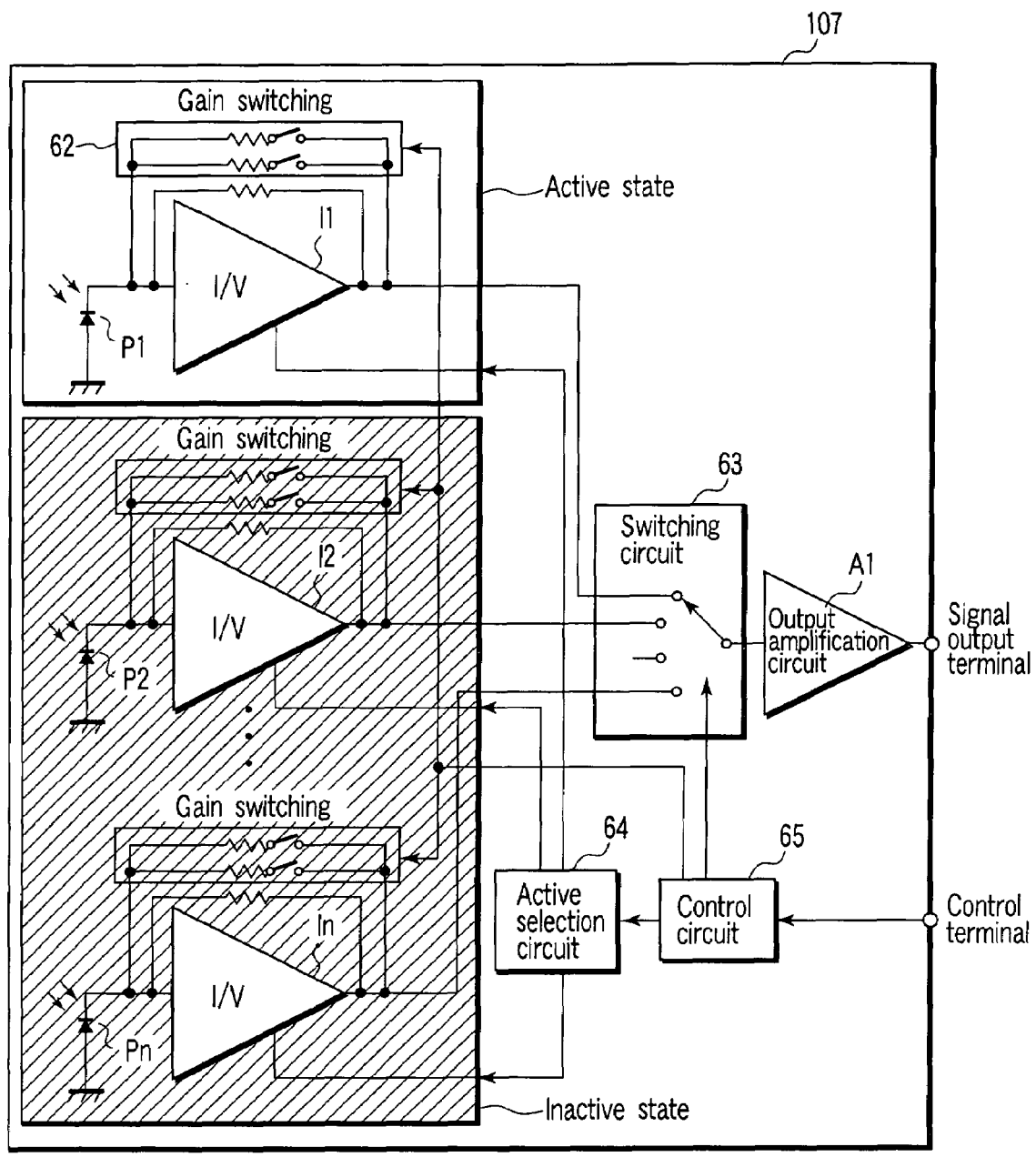
FIG. 12 is a diagram showing a light receiving element circuit constituted by adding an active selection circuit 64 to the circuit of FIG. 11.

FIG. 12 is a diagram showing a constitution of a light receiving element circuit 107 in an eighth embodiment of the present invention. The light receiving element circuit 107 is a circuit constituted by adding, to the circuit of FIG. 11, an active selection circuit 64 which selects an active state or an inactive state of a plurality of light receiving elements P1 to Pn and/or a plurality of converting amplification circuits I1 to In. The circuit performs control of the active selection circuit, control of a switching circuit 63 of an input signal to an output amplification circuit A1 and control of gain setting of the converting amplification circuits I1 to In by use of one control terminal or control terminals for one system. A control circuit 65 divides a control signal to be input into the control terminal into control signals for a gain switching circuit, an output switching circuit and the active selection circuit, and sends each signal to the corresponding circuit.

For example, the light receiving element P1 and the converting amplification circuit I1 are used as circuit elements on the side of a DPD system, and the light receiving elements P2 to Pn and the converting amplification circuits I2 to In are used as circuit elements on the side of a PP system. In a case where a tracking signal system at a time when a power supply is turned on is determined as the DPD signal system, the light receiving elements P2 to Pn and the converting amplification circuits I2 to In on the side of a PP system are brought into an inactive state, the PP system being the other tracking system which is not used. The light receiving element P1 and the converting amplification circuit I1 on the side of the DPD system are brought into an active state.

Moreover, when the circuit elements on the side of the PP system are used, the light receiving elements P2 to Pn and the converting amplification circuits I2 to In for use in the PP system are brought into the active state, and the light receiving element P1 and the converting amplification circuit I1 for use as the circuit elements on the side of the DPD system are brought into the inactive state.

When control of the active selection circuit 64, control of the switching circuit 63 of the input signal into the output amplification circuit A1, and gain setting control of the converting amplification circuits I1 to In are performed by use of one control terminal or control terminals for one system, space saving, miniaturization, simplification and reduction of wiring lines are possible. As a result, it is possible to reduce input terminals of a pickup circuit, and the circuit is simplified.

NINTH EMBODIMENT

Figure 13:
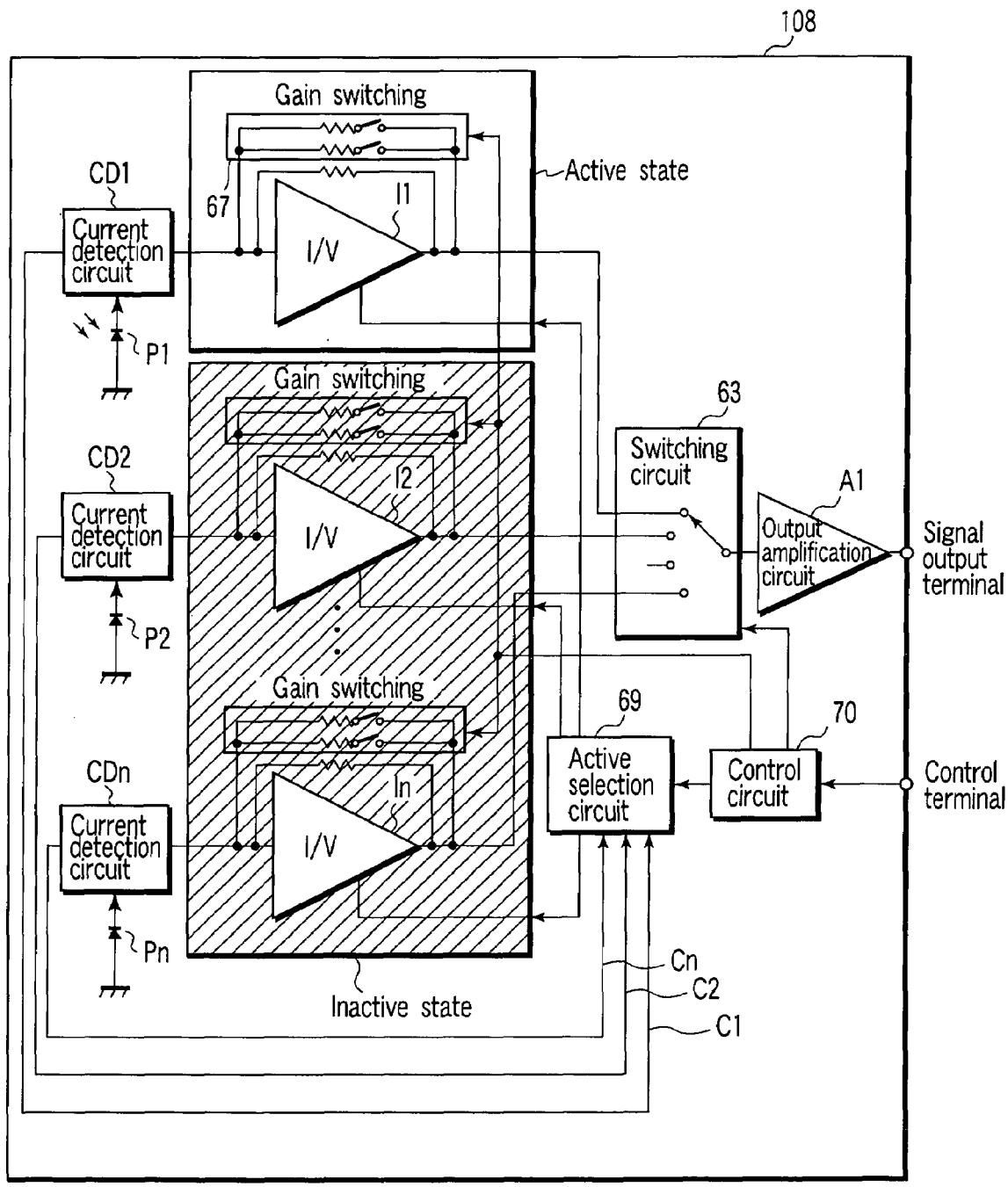
FIG. 13 is a diagram showing a light receiving element circuit constituted by adding current detection circuits CD1 to CDn to the circuit of FIG. 12.

FIG. 13 is a diagram showing a constitution of a light receiving element circuit 108 in a ninth embodiment of the present invention. The light receiving element circuit 108 is a light receiving element circuit constituted by adding, to the circuit of FIG. 12, current detection circuits CD1 to CDn which detect currents flowing through light receiving elements P1 to Pn at a time when light enters the circuit, and connecting output signal lines C1 to Cn from the current detection circuits to an active selection circuit. Instead of controlling an inactive state or an active state of the light receiving elements P1 to Pn and converting amplification circuits I1 to In from the outside, the light incident on the light receiving element is detected to automatically set the active or inactive state of the plurality of light receiving elements P1 to Pn and the plurality of converting amplification circuits I1 to In.

For example, when the light receiving element P1 is irradiated with the light, and a current detection signal is input from the current detection circuit CD1 into the active selection circuit, the converting amplification circuit I1 and the output amplification circuit A1 are brought into an active state in a stage subsequent to the light receiving element. In addition, the light receiving element which is not irradiated with the light and the converting amplification circuit for the element are set to the inactive state by the active selection circuit.

When the presence of the irradiation with the light is monitored by use of the current detection circuits CD1 to CDn, the only light receiving element irradiated with the light and the converting amplification circuit for the element are brought into the active state, and the other circuit elements are brought into the inactive state, power consumption is reduced, and heat generation can be inhibited. As this derivative result, an amount of heat to be generated in the whole pickup circuit is reduced, and an operation stability of an optical disk drive enhances. When power consumption is suppressed, a battery use time can be lengthened in the optical disk drive.

Moreover, the current detection circuits CD1 to CDn are disposed in the light receiving element circuit, and the active or inactive state of the light receiving elements and the converting amplification circuits is automatically distinguished. This obviates the need for a terminal to control the active selection circuit, and results in reduction of terminals. As the result, the pickup circuit is simplified.

TENTH EMBODIMENT

In FIG. 13, as a default state at a time when a power supply is turned on, converting amplification circuits I1 to In and an output amplification circuit A1 are brought into an inactive state. Thereafter, a current detection circuit detects that a light signal has been incident on a light receiving element, first the converting amplification circuit and the output amplification circuit in a stage subsequent to the light receiving element are brought into an active state, and the light receiving element which does not have any input of the light signal is kept to be inactive.

The presence of irradiation with light is monitored using current detection circuits CD1 to CDn, and the inactive state is maintained from the time when the power supply is turned on until the element is irradiated with light. In consequence, it is possible to reduce power consumption and inhibit heat generation. As this derivative result, an amount of heat to be generated in the whole pickup circuit is reduced, and an operation stability of an optical disk drive enhances.

Moreover, when the power consumption is suppressed, a battery use time can be lengthened in the optical disk drive.

Furthermore, the current detection circuits CD1 to CDn are disposed in a light receiving element circuit, and the active or inactive state of the light receiving elements and the converting amplification circuits is automatically distinguished. This obviates the need for a terminal to control an active selection circuit, and results in reduction of terminals. As the result, the pickup circuit is simplified.

ELEVENTH EMBODIMENT

In FIG. 12, in a case where a switching circuit 63 selects a combination of one light receiving element or a plurality of light receiving elements and one converting amplification circuit or a plurality of converting amplification circuits among a plurality of light receiving elements P1 to Pn and a plurality of converting amplification circuits I1 to In in response to a control signal from a control terminal, the switching circuit 63 brings the selected combination of the light receiving element and the converting amplification circuit into an active state, brings the non-selected light receiving element and converting amplification circuit into an inactive state, and sets, to a high impedance, an output of the converting amplification circuit brought into the inactive state.

Figure 14:
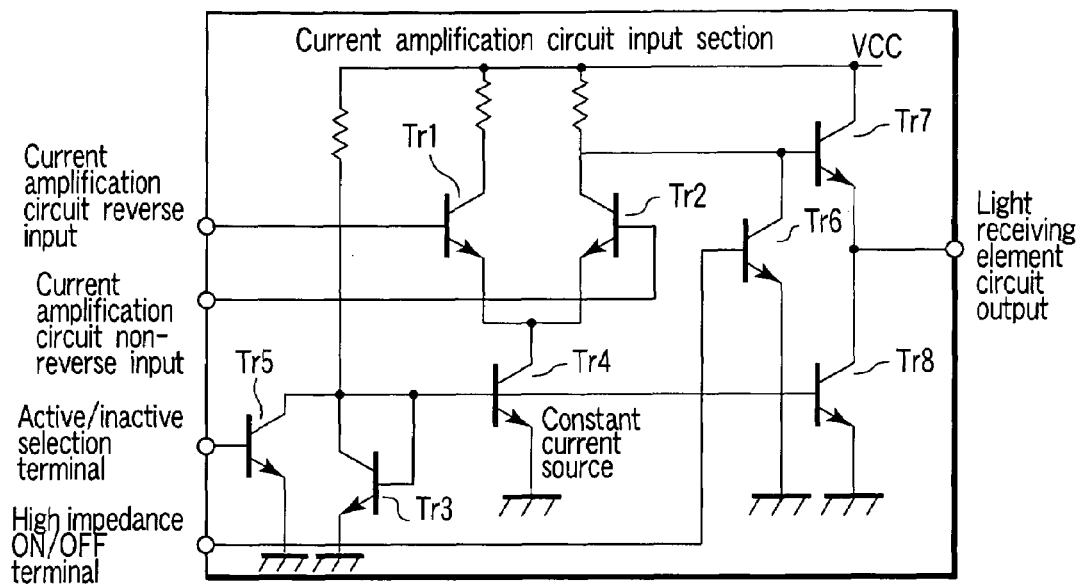
FIG. 14 is a diagram showing an internal circuit in which an output of a converting amplification circuit or an output of an output amplification circuit is set to a high impedance.

FIG. 14 shows an internal circuit in which the output of the converting amplification circuit or an output of an output amplification circuit is set to the high impedance. Since selection of the active or inactive state of a converting amplification circuit input section has been described in the third embodiment with reference to FIG. 8, description thereof is omitted.

In FIG. 14, transistors Tr7, Tr8 connected to a light receiving element circuit output form an output stage of the converting amplification circuit output or the output amplification circuit output. A base of the transistor Tr8 is connected to an active/inactive selection terminal. When an ON voltage is applied to an active/inactive selection terminal input, and a transistor Tr5 is turned on, a current flows through a Tr5 side. Therefore, the base of the transistor Tr8 is set to GND, and the transistor Tr8 is brought into an OFF state. A high-impedance ON/OFF terminal is connected to a base of a transistor Tr6.

When the ON voltage is applied to the high-impedance ON/OFF terminal, the transistor Tr6 is brought into an ON state. Therefore, a collector voltage of the transistor Tr6 is brought close to a GND state, and the transistor Tr7 is brought into the OFF state. Accordingly, since the transistors Tr7 and Tr8 are brought into the OFF state, the light receiving element circuit output is brought into a high impedance state in which anything is not connected.

As described above, when the control signal is input from an active selection circuit 72 to an active/inactive input terminal of each of the converting amplification circuits I1 to In, the output of the converting amplification circuit or an output of an output voltage circuit in the inactive state can be brought into a high-impedance state.

In FIG. 14. the active/inactive selection terminal and the high-impedance ON/OFF terminal are separately set, but the same input terminal may be set so that the output is set to the high impedance in the inactive state.

TWELFTH EMBODIMENT

Figure 15:
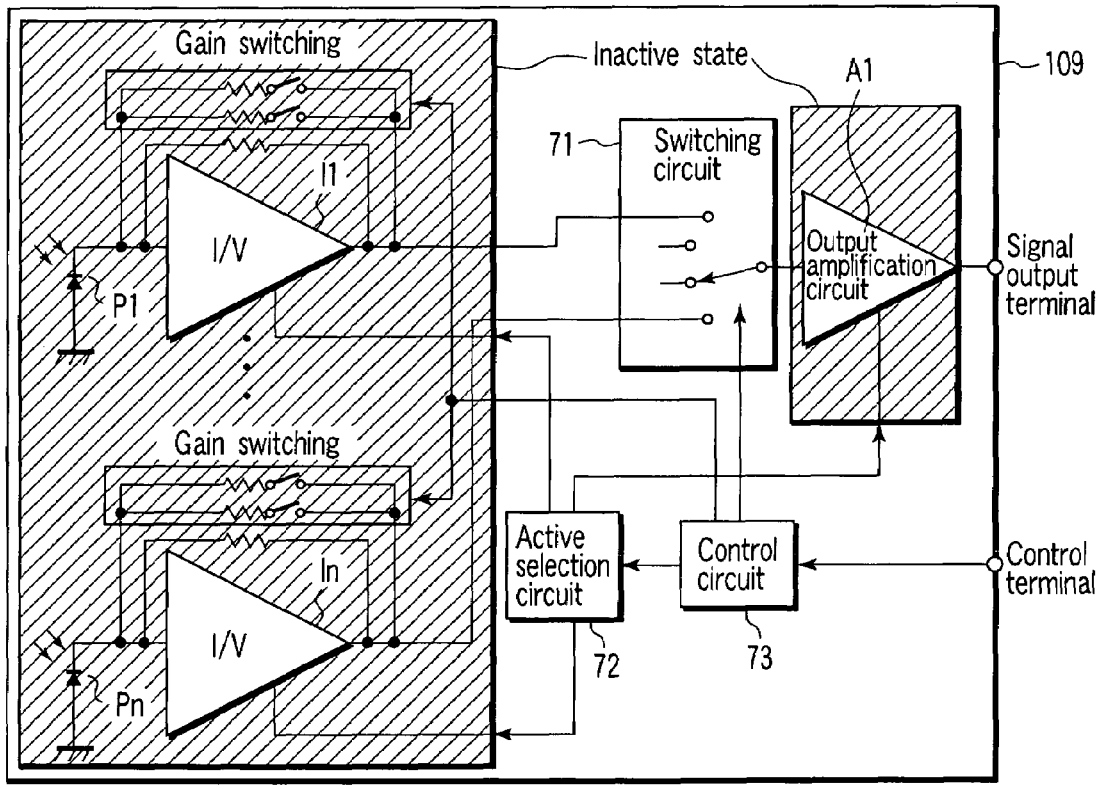
FIG. 15 is a diagram showing a state at a time when an output of an output amplification circuit A1 is set to a high impedance.

FIG. 15 is a diagram showing a constitution of a light receiving element circuit 109 in a twelfth embodiment of the present invention. In a case where an output of the light receiving element circuit is connected to that of another light receiving element circuit for use, when an output state is an active state, the outputs collide with each other. Therefore, a normal output is not obtained. To solve the problem, as shown in FIG. 15, the output of an output amplification circuit A1 is set to a high impedance.

For example, in a case where a switching circuit 71 does not select outputs of all converting amplification circuits I1 to In in response to a control signal from a control terminal, and further an active selection circuit 72 brings the output amplification circuit A1 into an inactive state, the output of the output amplification circuit A1 is set to the high impedance. An internal circuit which sets the output of the output amplification circuit A1 to the high impedance is similar to that of FIG. 14.

Figure 16:
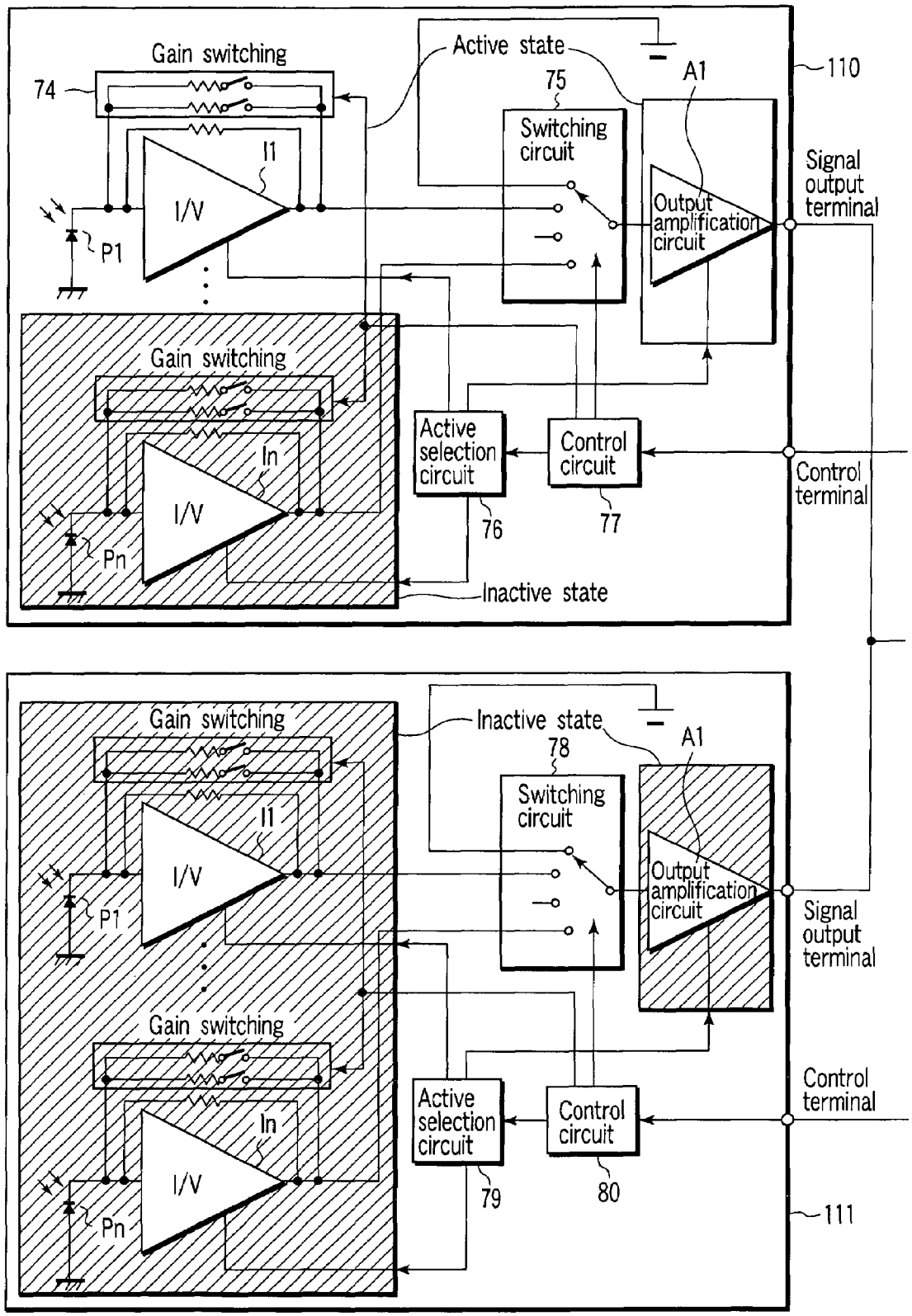
FIG. 16 is a diagram showing an example of a case where different outputs of a light receiving element circuit are connected to each other.

FIG. 16 shows an example of a case where different outputs of light receiving element circuits 110, 111 are connected to each other.

In FIG. 16, the output of the light receiving element circuit 111 which is not used is set to the high impedance in response to a control input signal from a control terminal of the light receiving element circuit 111, and an output amplification circuit A1 of the light receiving element circuit 110 for use is brought into an active state. Accordingly, the output of the light receiving element circuit 110 becomes valid, and the only output from the light receiving element circuit 110 is transmitted onto a shared output wiring line.

As in the above eleventh embodiment, the active selection circuit is operated to bring into the inactive state the light receiving element and the converting amplification circuit which are not selected by the switching circuit, and the output of the converting amplification circuit brought into the inactive state is set to the high impedance in the light receiving element circuit. Accordingly, the outputs of the converting amplification circuits I1 to In which amplify output currents of the light receiving elements can be selected without any switching circuit. Therefore, it is possible to achieve simplification of the circuit, reduction of terminals of the light receiving element circuit, reduction of components and reduction of power consumption due to the simplification and the reductions, and it is possible to inhibit excessive heat generation of the light receiving element circuit itself. As the derivative result, an amount of heat to be generated in the whole pickup circuit is reduced, and operation stabilities of an optical head device and an optical disk drive enhance.

Moreover, as in the above twelfth embodiment, since the output of the light receiving element circuit is set to the high impedance, the outputs of the light receiving element circuits 110, 111 are connected to each other, and the output of one light receiving element circuit can be selected without using any switching circuit. In consequence, the light receiving element circuit is simplified. As the derivative result, heat generation can be inhibited. As described above, the amount of heat to be generated in the whole pickup circuit is reduced, and the operation stability of the optical disk drive enhances.

THIRTEENTH EMBODIMENT

Figure 17:
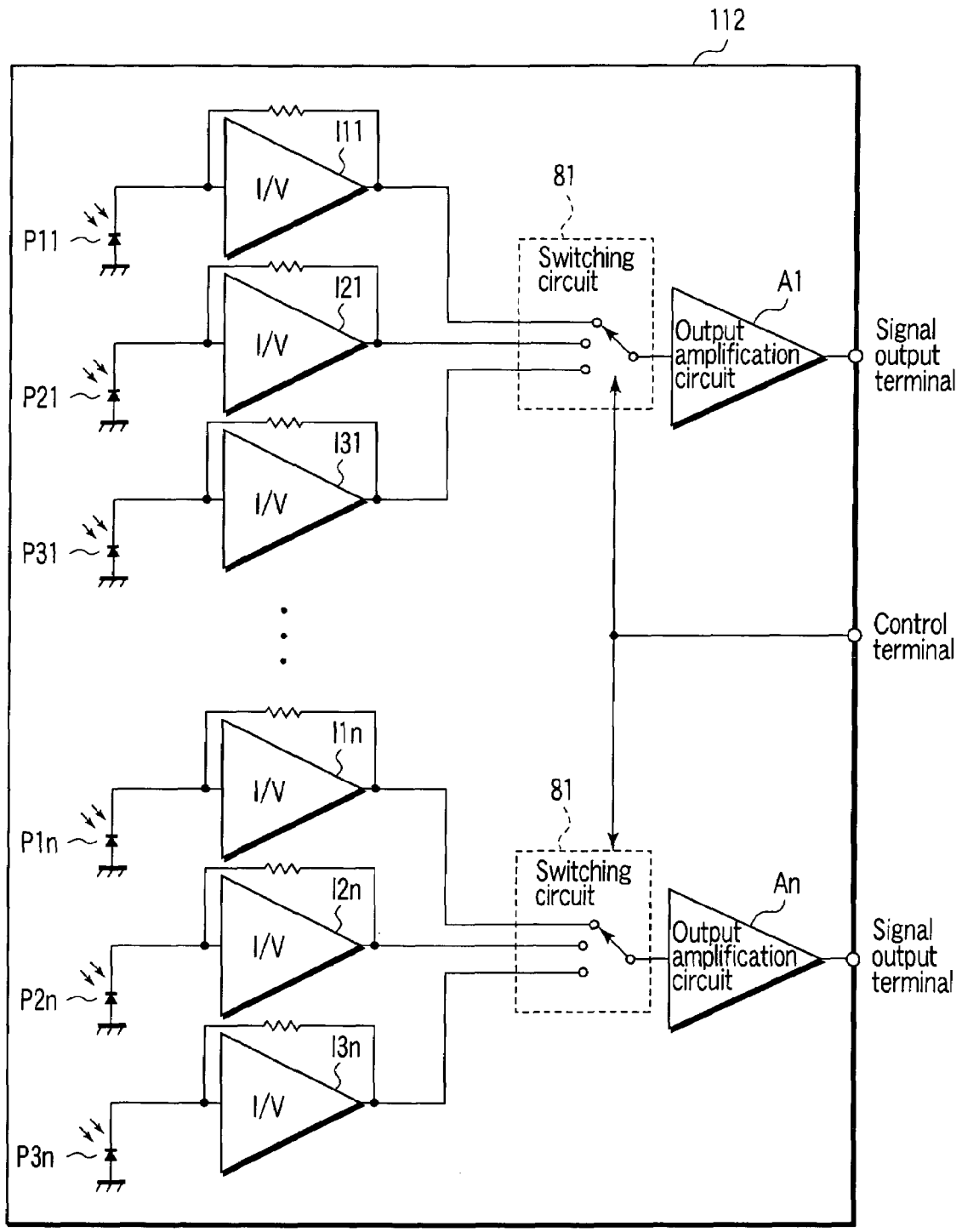
FIG. 17 is a diagram showing a constitution of a light receiving element circuit to be applied to an optical head device having a three-wavelength light source capable of matching with CD/DVD/HD DVD.

FIG. 17 is a diagram showing a constitution of a light receiving element circuit 112 in a thirteenth embodiment of the present invention. The thirteenth embodiment is an example of the present invention applied to an optical head device having a three-wavelength light source capable of matching with CD/DVD/HD DVD. In FIG. 17, among a plurality of light receiving elements, for example, it is assumed that a light receiving element group for the HD DVD includes elements P11 to P1n, a light receiving element group for the DVD includes elements P21 to P2n, and a light receiving element group for the CD includes elements P31 to P3n. Furthermore, it is assumed that the group of light receiving elements P11 to P1n for the HD DVD is connected to converting amplification circuits I11 to I1n, the group of light receiving elements P21 to P2n for the DVD is connected to converting amplification circuits I21 to I2n, and the group of light receiving elements P31 to P3n for the CD is connected to converting amplification circuits I31 to I3n, respectively. The circuits I11, I21 and I31 are connected to an output amplification circuit A1 through a switching circuit 81 having a control terminal. Another converting amplification circuit is similarly connected to the output amplification circuit.

In the optical head device 11 of FIG. 1, when a power supply is turned on, control of a signal processing unit 12 allows an LD 21 of the HD DVD, the DVD or the CD to emit light, and a lead-in area of a disk D is accessed. In this case, when a loaded optical disk is the HD DVD, the switching circuit is selected to output the group of light receiving elements P11 to P1n and the group of converting amplification circuits I11 to I1n for the HD DVD in response to the control signal from the control terminal. When the loaded disk is the DVD, the group of light receiving elements P21 to P2n and the group of converting amplification circuits I21 to I2n for the DVD are selected. When the loaded disk is the CD, the group of light receiving elements P31 to P3n and the group of converting amplification circuits I31 to I3n for the CD are selected.

In this manner, in the light receiving elements P11 to P1n, P21 to P2n and P31 to P3n and the converting amplification circuits I11 to I1n, I21 to I2n and I31 to I3n, three light receiving elements corresponding to wavelengths, respectively, are connected to one output amplification circuit through the switching circuit 81, and accordingly the output amplification circuits are reduced. Therefore, components in the light receiving element circuit are reduced, it is possible to achieve space saving of the light receiving element circuit, miniaturization and reduction of output terminals of the light receiving element circuit, and a circuit design becomes simple. Owing to the reduction of the components, reduction of power consumption is possible.

Therefore, an amount of heat to be generated can be suppressed, this results in reduction of the amount of heat to be generated in the whole pickup circuit, and an operation stability of the optical head device enhances. When the power consumption is suppressed, a battery use time can be lengthened in the optical head device, and a drive use time can be lengthened.

In an example of FIG. 17, since the light receiving elements P1 to P1n, P2 to P2n and P3 to P3n for the wavelengths, respectively, are connected to the common converting amplification circuit, a gain of the light receiving element circuit for each wavelength is set in accordance with each PD sensitivity difference only.

FOURTEENTH EMBODIMENT

Figure 18:
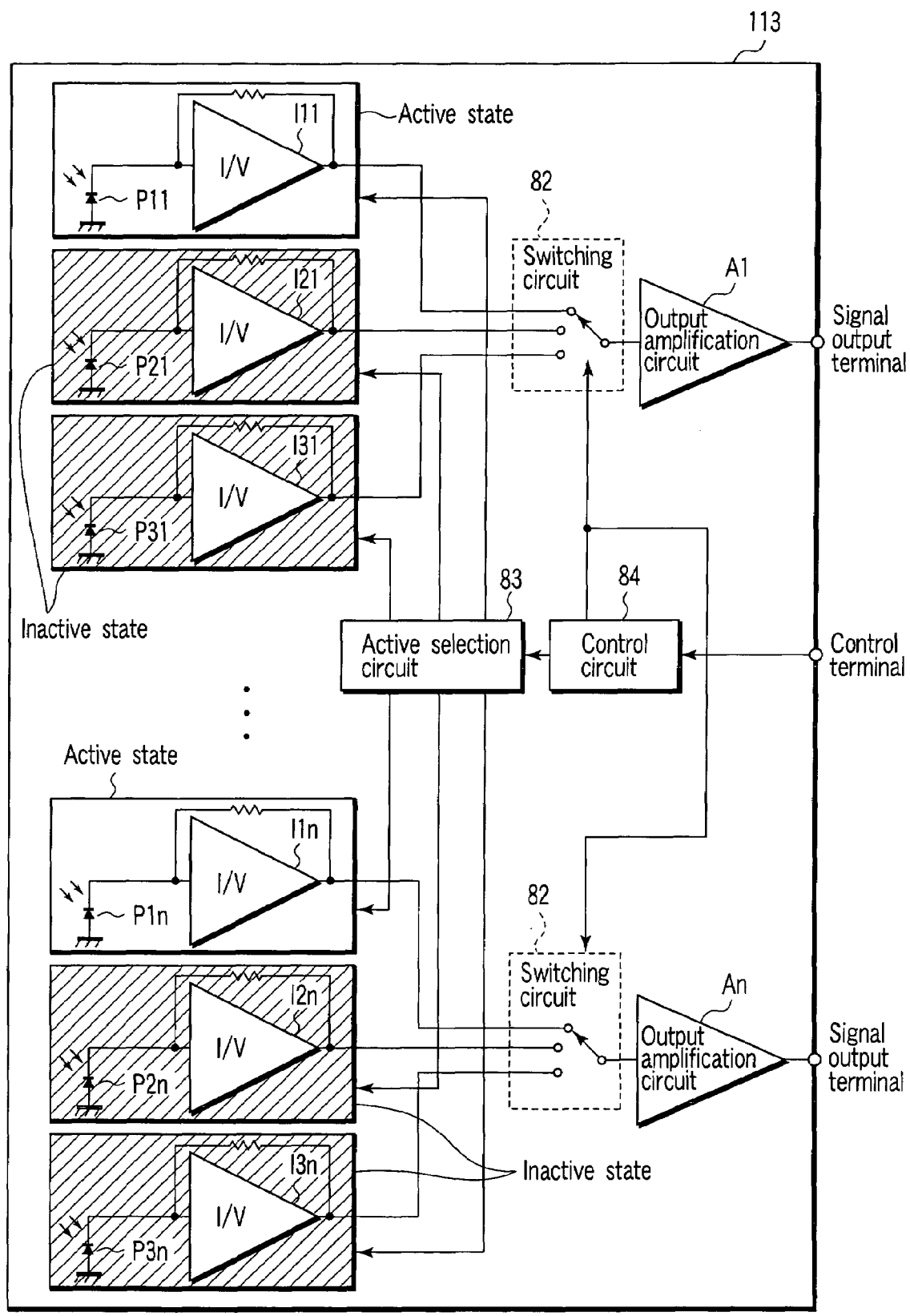
FIG. 18 is a diagram showing a circuit constituted by adding an active selection circuit to the circuit of FIG. 17.

FIG. 18 shows, as a fourteenth embodiment, a circuit constituted by adding an active selection circuit 83 to the circuit of FIG. 17.

In a light receiving element circuit 113, a circuit section which sets an active state or an inactive state can set not only a light receiving element section but also a converting amplification circuit in the subsequent stage to the active state or the inactive state. When a loaded optical disk is an HD DVD, a switching circuit 82 is switched to a group of light receiving elements P11 to P1n and converting amplification circuits I11 to I1n for the HD DVD in response to a control signal from a control terminal. At this time, the control signal is also input into the active selection circuit 83, the elements P11 to P1n and the circuits I11 to I1n are brought into the active state, and the light receiving element groups and the converting amplification circuits for a DVD and a CD which are not selected are brought into the inactive state.

Similarly, when the loaded optical disk is a DVD, a group of light receiving elements P21 to P2n and converting amplification circuits I21 to I2n for the DVD are brought into the active state, and the other light receiving element groups and converting amplification circuits are brought into the inactive state. Furthermore, when the loaded optical disk is a CD, a group of light receiving elements P31 to P3n and converting amplification circuits I31 to I3n for the CD are brought into the active state, and the other light receiving element groups and converting amplification circuits are brought into the inactive state.

This fourteenth embodiment is an example applied to an optical head device having a three-wavelength light source capable of matching with CD/DVD/HD DVD. When the light receiving element other than that corresponding to the loaded optical disk and the amplification circuit for the element are brought into the inactive state, power consumption is reduced. Therefore, it is possible to suppress an amount of heat to be generated, the amount of heat to be generated in the whole optical head device is reduced, and an operation stability of the optical head device increases. When the power consumption of the optical head device is suppressed, a battery use time of an optical disk drive can be lengthened.

FIFTEENTH EMBODIMENT

Figure 19:
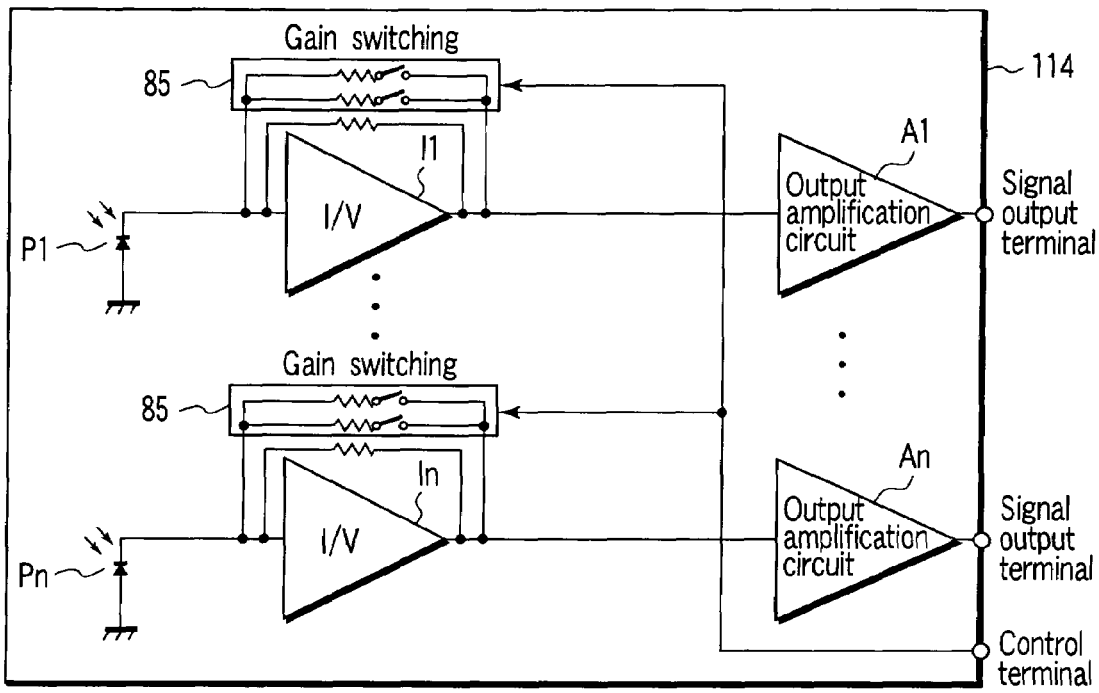
FIG. 19 is a diagram showing a circuit in which gains of converting amplification circuits I1 to In can be switched to three stages on the basis of the gain for an HD DVD.

FIG. 19 shows, as a fifteenth embodiment, a light receiving element circuit which can switch gains of converting amplification circuits I1 to In to three stages on the basis of a gain for an HD DVD. When a loaded optical disk is the HD DVD, a light receiving element circuit 114 sets the gains of the converting amplification circuits I1 to In to the gain for the HD DVD in response to a control signal from a control terminal. Similarly, when the loaded optical disk is a DVD, the gain is set to a gain for the DVD. When the disk is a CD, the gain is set to a gain for the CD.

SIXTEENTH EMBODIMENT

Figure 20:
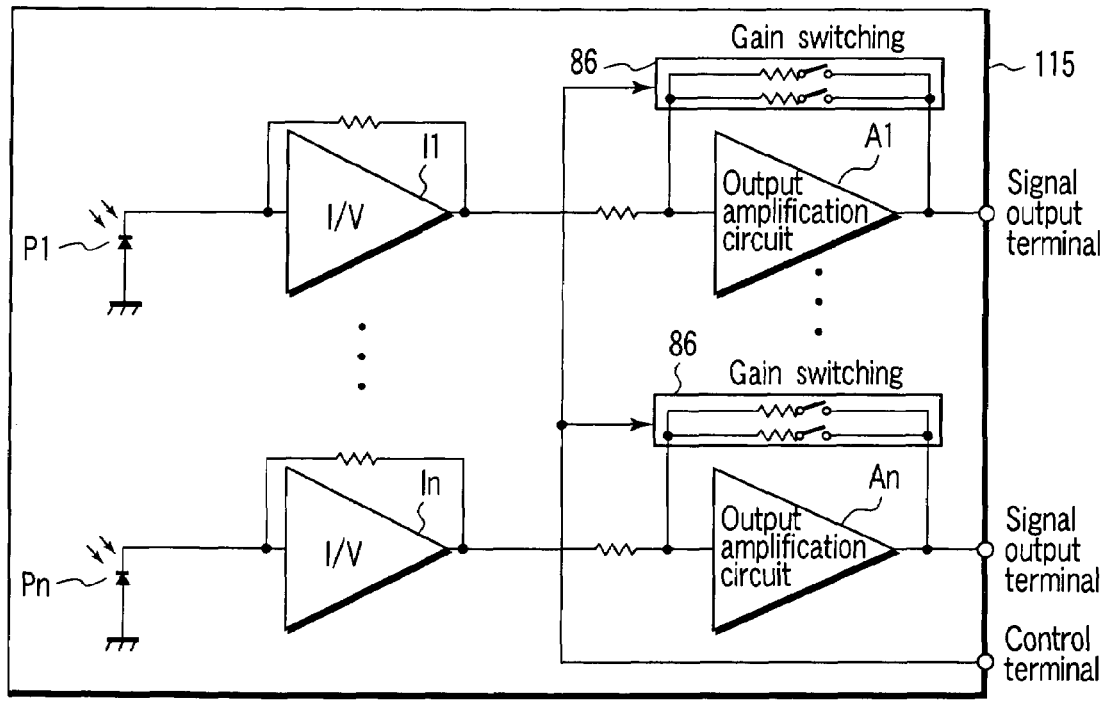
FIG. 20 is a diagram showing a circuit in which gains of converting amplification circuits A1 to An can be switched to three stages on the basis of the gain for the HD DVD.

FIG. 20 shows, as a sixteenth embodiment, a light receiving element circuit which can switch gains of output amplification circuits A1 to An to three stages on the basis of a gain for an HD DVD. When a loaded optical disk is the HD DVD, a light receiving element circuit 115 sets the gains of the output amplification circuits A1 to An to the gain for the HD DVD in response to a control signal from a control terminal. Similarly, when the loaded optical disk is a DVD, the gain is set to a gain for the DVD. When the disk is a CD, the gain is set to a gain for the CD.

The fifteenth and sixteenth embodiments are examples of the present invention applied to an optical head device having a three-wavelength light source capable of matching with CD/DVD/HD DVD. When the gain of the converting amplification circuit is varied, a photoelectric conversion efficiency of the light receiving element for each wavelength is compensated. Therefore, it is sufficient to dispose only one light receiving element group, and design can be simplified.

SEVENTEENTH EMBODIMENT

In the fourteenth and fifteenth embodiments (see FIGS. 18, 19), one of a gain of each of converting amplification circuits I1 to In and a gain of each of output amplification circuits A1 to An is switched, and a gain value of a light receiving element circuit is set. However, both of the gain of each of the converting amplification circuits I1 to In and the gain of each of the output amplification circuits A1 to An may be switched to determine the gain value of the light receiving element circuit.

This seventeenth embodiment is an example of a combination of the fifteenth and sixteenth embodiments, and an example applied to an optical disk drive having a three-wavelength light source capable of matching with CD/DVD/HD DVD. A gain setting range can broadly be taken, and the gains of the converting amplification circuit and the output amplification circuit are varied, whereby a photoelectric conversion efficiency of a light receiving element for each wavelength is compensated. Therefore, it is sufficient to dispose only one light receiving element group, and design can be simplified.

EIGHTEENTH EMBODIMENT

In the sixteenth embodiment (see FIGS. 19, 20), in a light receiving element circuit which can switch gains of converting amplification circuits I1 to In or output amplification circuits A1 to An, a maximum gain value of the light receiving element circuit is set to a maximum gain value of an HD DVD, and a gain is set in proportion to that of another HD DVD. A gain of a DVD is proportionally determined from a ratio between a blue PD sensitivity and a red PD sensitivity based on the maximum gain value of the HD DVD.

In an optical disk such as a CD, the DVD and the HD DVD, there are disks having various characteristics, such as a read-only disk, a rewritable disk and a write-once read-many disk. The disks have different laser powers for reading, respectively. Furthermore, recordable disks have different laser powers for writing, respectively. Therefore, to record and reproduce information with respect to various types of optical disks, signal gains of the light receiving element circuit need to be set to various values.

For example, when the HD DVD maximum gain is 30 mV/μW, a gain ratio is set to 128. The other gain values of the HD DVD are proportionally determined as follows.

When eight gain ratios 1, 2, 4, 8, 16, 32, 64 and 128 are determined as the gain ratios for the HD DVD, as the HD DVD gain values, with respect to the gain ratios (1, 2, 4, 8, 16, 32, 64 and 128), there are determined gain values (30 [mV/μW]/128, 30 [mV/μW]/64, 30 [mV/μW]/32, 30 [mV/μW]/16, 30 [mV/μW]/8, 30 [mV/μW]/4, 30 [mV/μW]/2 and 30 [mV/μW]/1).

Moreover, on the basis of a blue gain ratio of 128, the maximum gain ratio of the DVD is set to 64 from the ratio between the blue PD sensitivity and the red PD sensitivity, and the gain ratios of the DVD are determined as 0.5, 1, 2, 4, 8, 16, 32 and 64.

A specific gain value of the DVD is determined by a blue gain maximum value 30 mV/μW and the ratio between the blue PD sensitivity and the red PD sensitivity. For example, assuming that the blue PD sensitivity is 0.3 A/W and the red PD sensitivity is 0.45 mA/μW, the DVD maximum gain value is set as follows:

0.45/0.3*30 mV/μW*64/128=22.5 mV/μW.

This determines the gain value at a DVD gain ratio of 64.

Thereafter, the gain values are determined with respect to gain ratios of 0.5 to 32 from a gain value of 22.5 mV/μW at the DVD gain ratio of 64.

This eighteenth embodiment is an example applied to an optical disk drive having a three-wavelength light source capable of matching with CD/DVD/HD DVD. For example, when a light receiving element gain for the HD DVD is set, a gain of a light receiving element circuit for the DVD is determined by the ratio between the blue PD sensitivity and the red PD sensitivity, and arbitrary gain setting is possible by setting the light receiving element gain and the converting amplification circuit gain.

For example, in a case where there is considered an objective lens emission power during recording in disks such as the HD DVD and the DVD, the existing DVD has a higher recording speed and a larger recording power. Therefore, the DVD has a larger light power that is reflected on the disk and that is incident on the light receiving element. When the blue PD sensitivity is compared with the red PD sensitivity, the red PD sensitivity is larger. Therefore, in a case where the gain is set with the only PD sensitivity ratio for each wavelength, since a dynamic range of a light receiving element circuit output is determined, the light receiving element circuit output might be saturated during the DVD recording, even if the gain is set to such a range that the output falls in the dynamic range during the HD DVD recording.

Here, from the ratio between the blue PD sensitivity and the red PD sensitivity, the light receiving element gain and the converting amplification circuit gain, the gain for the DVD is set to be lower than that for the HD DVD, and the gain is set so that the output is not saturated during the DVD recording.

NINETEENTH EMBODIMENT

In the sixteenth embodiment (see FIGS. 19, 20), a gain value of a light receiving element circuit is determined by gains of converting amplification circuits I1 to In or output amplification circuits A1 to An, but the gains of the converting amplification circuits I1 to In and the output amplification circuits A1 to An may be determined with a certain gain ratio to set the gain value of the light receiving element circuit.

For example, the gain ratio of the converting amplification circuits I1 to In is fixed to 0.5 to 8, and the gain ratio of the output amplification circuits A1 to An is fixed to 1 to 2. The gain of the light receiving element circuit is determined as a combined gain by the gain ratio of the front-stage converting amplification circuits I1 to In and the gain ratio of the output amplification circuits A1 to An connected to the converting amplification circuits.

TWENTIETH EMBODIMENT

There will be described hereinafter an embodiment of a light receiving element circuit in which differential output circuits are used as the above-described output amplification circuits A1 to An.

To simplify the above description, the respective output amplification circuits A1 to An have been described as single output amplification circuits. In today's optical disk drive, with high densification of a disk, there is a demand for shortening of an information read or write time with respect to the disk or increasing of a response speed of the disk drive. Therefore, as a form of an HF signal to be output from the light receiving element circuit, positive-phase and negative-phase differential output signal forms are adopted in many cases.

Figure 21:
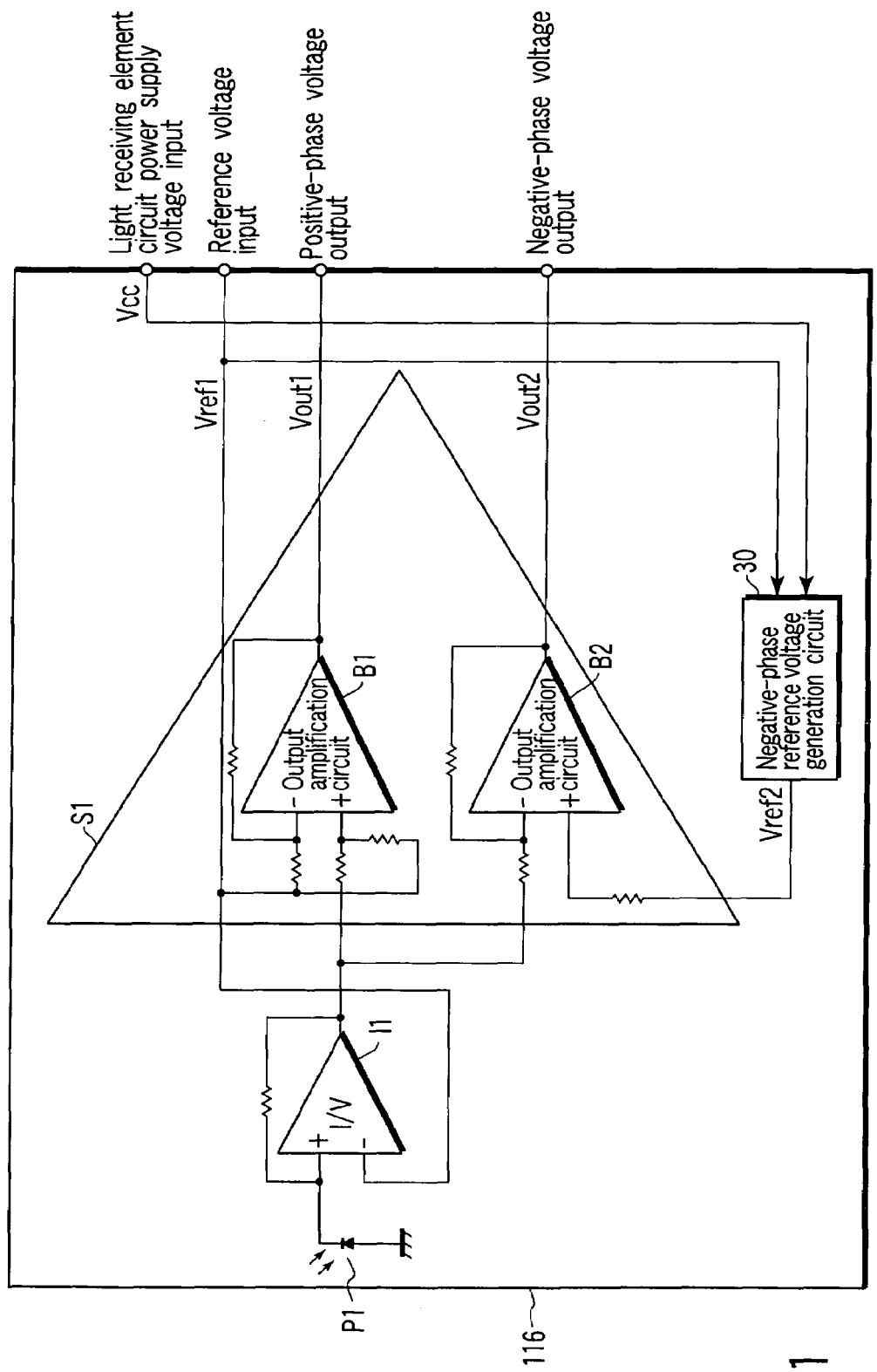
FIG. 21 is a diagram showing an embodiment of a light receiving element circuit having a differential output circuit.

FIG. 21 shows a light receiving element circuit 116 as a twentieth embodiment of the light receiving element circuit 28 of FIG. 1.

As described above, the light receiving element circuit includes: a plurality of light receiving elements for generating a tracking error signal; a plurality of light receiving elements for generating a focus error signal; and a plurality of amplification circuits disposed for light receiving elements, respectively. FIG. 21 shows an only circuit constitution concerning one light receiving element P1.

A light receiving element circuit power supply voltage Vcc and a reference voltage Vref1 are supplied from the signal processing unit 12 of FIG. 1 to the light receiving element circuit 116. As shown in FIG. 21, the reference voltage Vref1 is input as a positive-phase reference voltage into a non-inverting input terminal of a converting amplification circuit I1 and an output amplification circuit B1 on the side of a positive-phase output. An amplifier S1 is the differential output circuit.

A light signal which has been incident on the light receiving element P1 is photoelectrically converted. When light is incident on the light receiving element P1, a current proportional to an intensity of the incident light flows through the light receiving element P1 from a cathode side to an anode side. Since the converted current flows via a non-inverting terminal of the converting amplification circuit I1, the converting amplification circuit I1 outputs a voltage higher than the reference voltage Vref1. The voltage converted by the converting amplification circuit I1 is input into the output amplification circuit B1 and an output amplification circuit B2.

In a case where any light is incident on the light receiving element P1, the reference voltage Vref1 is input into the non-inverting terminal of the converting amplification circuit I1, and output from the circuit. Since this reference voltage Vref1 is input into the positive-phase output amplification circuit B1, the reference voltage Vref1 is output as a positive-phase output voltage Vout1.

In a case where the light is incident on the light receiving element P1, as an incident light power enlarges, the output voltage of the converting amplification circuit I1 shifts to the positive side of the reference voltage Vref1. Therefore, a potential of the positive-phase output voltage Vout1 of the amplification circuit B1 shifts toward the positive side on the basis of the reference voltage Vref1.

A negative-phase reference voltage circuit 30 generates a negative-phase reference voltage Vref2 from the reference voltage Vref1 and the light receiving element circuit power supply voltage Vcc. The negative-phase reference voltage Vref2 is supplied to the output amplification circuit B2 on a negative-phase output side.

When the negative-phase reference voltage Vref2 is input into the non-inverting terminal of the output amplification circuit B2, the output amplification circuit B2 outputs a negative-phase defined voltage Vpr as a negative-phase output, in a case where any light is not incident on the light receiving element P1.

When the light is incident on the light receiving element P1, and the incident light power enlarges, the output voltage of the converting amplification circuit I1 shifts to the positive side of the reference voltage Vref1, and the output of the circuit is input into an inverting input of the negative-phase output amplification circuit B2. A potential of the negative-phase output voltage Vout2 of the output amplification circuit B2 shifts toward a negative side on the basis of the negative-phase reference voltage level Vref2 generated in the circuit.

Figure 22:
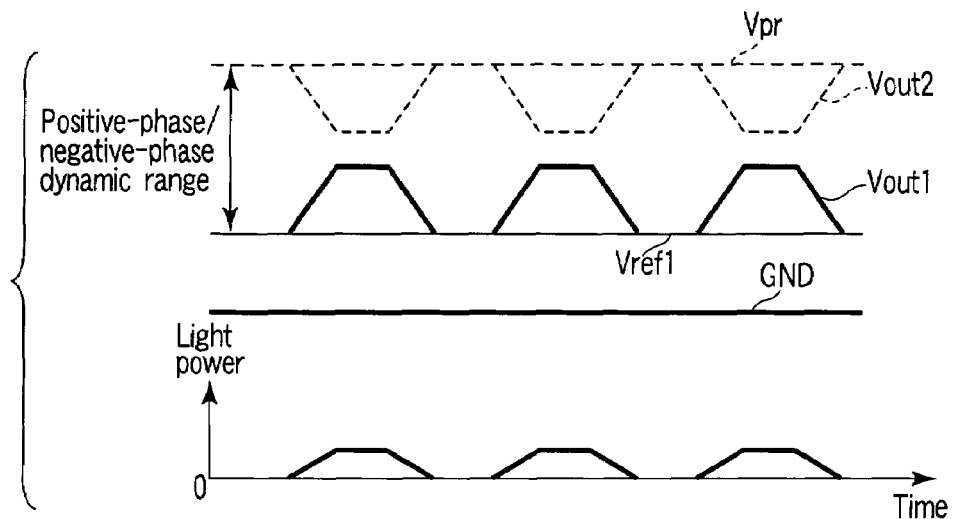
FIG. 22 is a diagram showing a relation between a light power of light which has been incident on a light receiving element P1 and a positive-phase output voltage Vout1 and a negative-phase output voltage Vout2.

FIG. 22 shows a relation between the light power of the light which has been incident on the light receiving element P1 and the positive-phase output voltage Vout1 and the negative-phase output voltage Vout2.

The positive-phase output voltage Vout1 is the reference voltage Vref1 in a case where any light power is not incident on the element. As the light power rises, the positive-phase output voltage rises to the positive side of the reference voltage Vref1 on the basis of this reference voltage. Similarly, the negative-phase output voltage Vout2 is the negative-phase defined voltage Vpr in a case where any light power is not incident on the element, and the voltage lowers to a negative side as the light power rises.

Moreover, when the incident light power decreases, the positive-phase output voltage Vout1 returns to a reference voltage Vref1 side, and the negative-phase output voltage Vout2 also returns to a negative-phase defined voltage Vpr side.

At this time, a range between the defined voltage Vpr of the negative-phase output amplification circuit B2 and the reference voltage Vref1 is set to a voltage range similar to a dynamic range of the light receiving element circuit (output amplification circuits B1, B2).

For example, in the present embodiment, in a case where light receiving element circuit power supply voltage Vcc is 5 V, the dynamic range of a differential output of the positive-phase and negative-phase output amplification circuits B1, B2 is 1.1 V, and the reference voltage Vref1 is 2.1 V, 2.1 V is input as the reference voltage Vref1 into the converting amplification circuit I1 and the positive-phase output amplification circuit B1, and the negative-phase output amplification circuit B2 outputs 2.1 V (=Vref1)+1.1 V (=dynamic range)=3.2 V as the negative-phase defined voltage Vpr. In other words, in a case where any light is not incident on the light receiving element P1, values of the negative-phase reference voltage Vref2 and an input resistance and a feedback resistance of the output amplification circuit B2 are set so that the negative-phase output amplification circuit B2 outputs this negative-phase defined voltage Vpr (=3.2 V).

Accordingly, when the positive-phase output voltage Vout1 is in a range of the reference voltage Vref1 which is an input from the outside to the dynamic range, and the negative-phase output voltage Vout2 is in a range of the negative-phase defined voltage Vpr to the reference voltage Vref1, there is output a signal having an amplitude corresponding to the light power which has been incident on the light receiving element P1. In this manner, since the dynamic range is not more than necessary value, power consumption of the light receiving element circuit is reduced.

Figure 23:
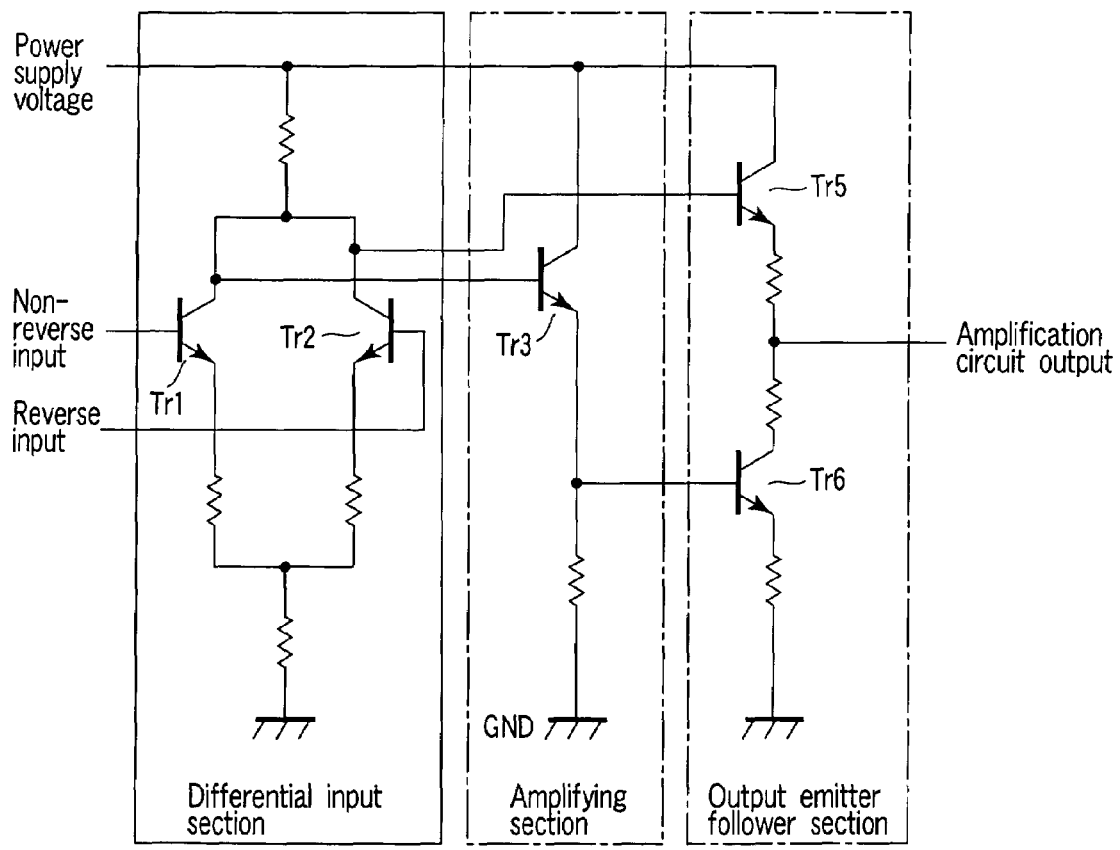
FIG. 23 is a diagram showing a simple constitution of a general amplification circuit.

Here, FIG. 23 shows a simple constitution of a general amplification circuit.

An output stage of the amplification circuit is an emitter follower, and constituted of two stages including transistors Tr5 and Tr6. During a normal operation, a voltage between a base and an emitter of the transistor Tr6 needs to be 0.7 V or more. When the output voltage drops to 0.7 V as the voltage between the base and the emitter, an output waveform cannot output a voltage of 0.7 V or less, and is formed as if it were clipped. This is a cause for distortion of the waveform. When an output voltage around 0.7 V is frequently used, power consumption of the amplification circuit increases. Therefore, as the output voltage of such amplification circuit, it is preferable to use a voltage range which is higher than the vicinity of 0.7 V.

In the present embodiment, as seen from the description and the waveform diagram of FIG. 22, the output voltage of 0.7 V or less is not used. Even if the output voltage of 0.7 V or less is not used, a sufficient dynamic range (S/N ratio) can be secured.

As described above, according to the present embodiment, there are two types (Vref1, Vref2) of reference voltages of the differential output circuit. Therefore, a circuit constitution of the amplification circuit itself is simplified as compared with a conventional differential output circuit. When the circuit is simplified and the output dynamic range is suppressed, the power consumption can be reduced. Since one type of reference voltage generation circuit can be omitted as compared with the conventional circuit, the circuit can be simplified, and the power consumption can be reduced.

Furthermore, as compared with a conventional constitution designed so that temperature drifts of three types of reference voltages are equal, a circuit constitution is simpler which is designed so that temperature drifts of two types of reference voltages are equal. As a result, the constitution is resistant to the temperature drifts. A voltage which is not more than the external reference voltage Vref1 is not used. Therefore, the distortion is not easily generated.

TWENTY-FIRST EMBODIMENT

Figure 24:
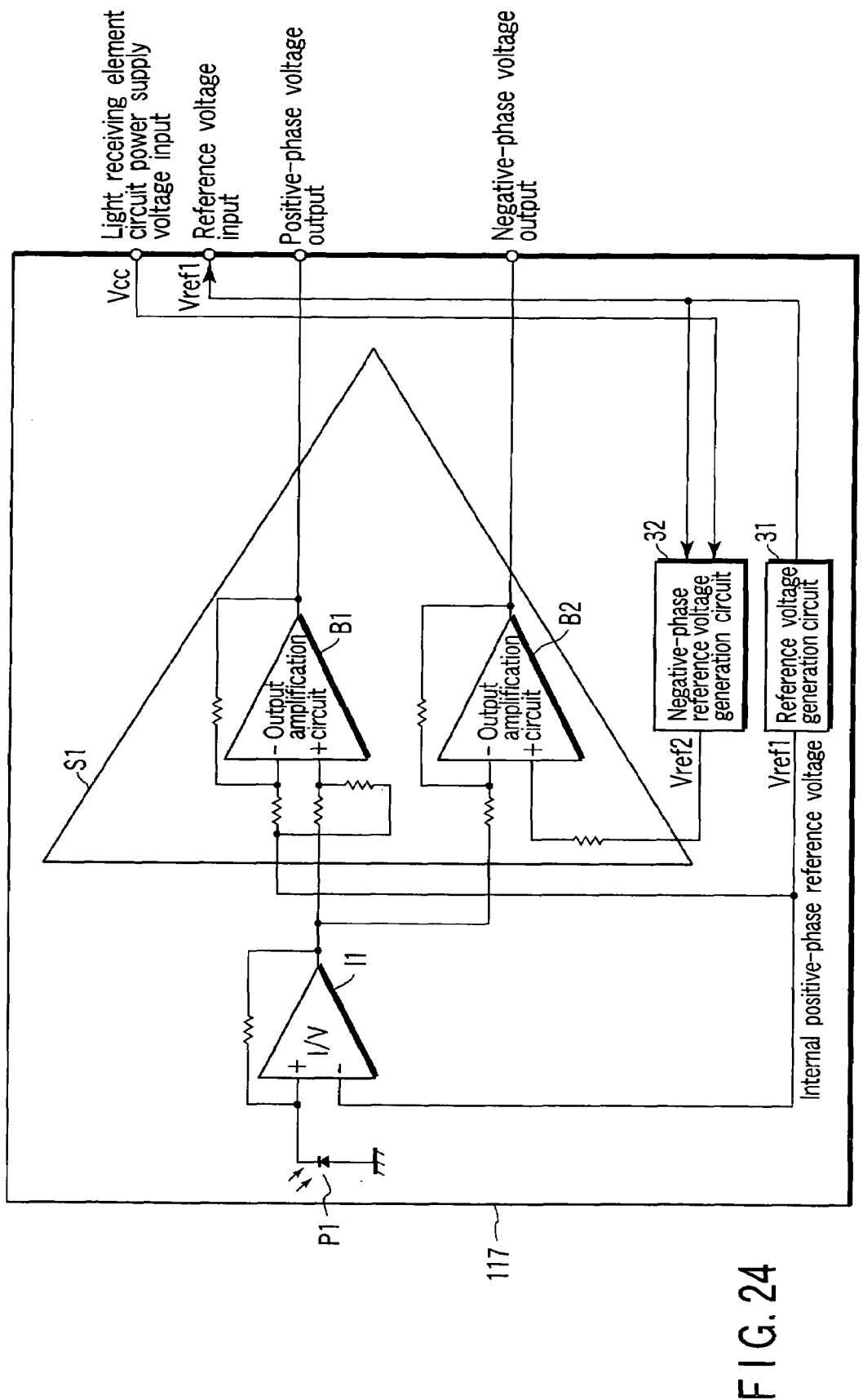
FIG. 24 is a diagram showing another embodiment of the light receiving element circuit having the differential output circuit.

FIG. 24 shows, as a twenty-first embodiment, a light receiving element circuit 117 which generates both of a negative-phase reference voltage Vref2 and a positive-phase reference voltage Vref1 in the light receiving element circuit.

A reference voltage generation circuit 31 utilizes a power supply voltage Vcc to be input into the light receiving element circuit 117 in generating the internal positive-phase reference voltage Vref1. The reference voltage Vref1 is supplied to a converting amplification circuit I1, also supplied from a reference voltage output terminal of the light receiving element circuit 117 to a signal processing IC (signal processing unit) connected to a subsequent stage of the light receiving element circuit 117, and utilized as a reference voltage of a servo system signal.

When the reference voltage is supplied from the light receiving element circuit 117 to the subsequent-stage signal processing IC, a temperature drift of the reference voltage on a light receiving element circuit 117 side agrees with that of the reference voltage of the subsequent-stage signal processing IC. Therefore, it is possible to constitute a system which is resistant to the temperature drift.

As described above, according to the twenty-first embodiment, in addition to the effect described in the twentieth embodiment, an internal reference voltage is also used in the reference voltage of the subsequent-stage circuit. Therefore, a potential is easily matched with that of the subsequent-stage circuit. Since the reference voltage is supplied from the light receiving element circuit to the subsequent-stage circuit, and the drift of the reference voltage is also reflected in the subsequent-stage circuit, the drifts can be eliminated on the light receiving element circuit side and the subsequent-stage circuit side.

TWENTY-SECOND EMBODIMENT

FIG. 25 shows, as a twenty-second embodiment, a light receiving element circuit 118 including a switch SW1 to switch whether a reference voltage Vref1 is to be generated in the circuit or input from the outside.

In FIG. 25, in a case where the reference voltage Vref1 is input from the outside, the changeover switch SW1 is turned off in response to a switching signal, and reference voltages input from the outside are used as a reference voltage to be supplied to a converting amplification circuit I1 of the light receiving element circuit and a reference voltage for use in a positive-phase output amplification circuit B1.

At this time, a negative-phase reference voltage Vref2 for use on a negative-phase output amplification circuit B2 side is generated in a negative-phase reference voltage generation circuit 32 as described above, and input into a non-inverting terminal of the negative-phase output amplification circuit B2. This negative-phase reference voltage Vref2 is not influenced by control of the changeover switch SW1.

Moreover, in a case where any reference voltage is not supplied from the outside, the changeover switch SW1 is turned on in response to the switching signal, and the reference voltage Vref1 generated in an internal reference voltage generation circuit 33 is supplied to the converting amplification circuit I1 and the positive-phase output amplification circuit B1. The negative-phase reference voltage Vref2 to be supplied to the negative-phase output amplification circuit B2 is generated as described above, and input into the negative-phase output amplification circuit B2.

Furthermore, the reference voltage Vref1 generated in the internal reference voltage generation circuit 33 is output as a reference voltage from a reference voltage input and output terminal of the light receiving element circuit to a subsequent-stage signal processing unit 12.

In consequence, since the reference voltage on a light receiving element circuit side can agree with that on a signal processing unit 12 side, a temperature drift is reflected in both of the circuits, and the circuits become resistant to the temperature drift.

As to the subsequent-stage signal processing unit 12, there are a unit which inputs the reference voltage Vref1 and a unit which outputs the voltage. This light receiving element circuit 118 of the twenty-second embodiment can meet both of the units.

It is to be noted that the light receiving element circuit 118 described in this embodiment switches input and output of the reference voltage Vref1 by the switch, but as to mask options, two types of masks may be prepared for a light receiving element circuit for exclusive use in reference voltage input and that for exclusive use in reference voltage output, and may be used in systems having different reference voltage supply systems, respectively.

The embodiments of this invention have been described above, and do not limit a device and a method of this invention, and various modifications can easily be performed.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A light receiving element circuit comprising:
   a plurality of light receiving elements which photoelectrically convert light signals carrying information, respectively;
   a plurality of first amplification circuits which amplify electric signals from the light receiving elements, respectively, wherein each of the plurality of first amplification circuits includes a current-voltage conversion circuit which converts a current obtained from the light receiving element into a voltage;
   a selecting section which selectively outputs one of the signals amplified by the plurality of first amplification circuits; and
   a second amplification circuit which amplifies the signal output from the selecting section and which supplies the signal to an output, wherein the second amplification circuit includes a differential output circuit which amplifies an output signal of the current-voltage conversion circuit and which outputs the signal as a differential signal,
   wherein the light receiving element circuit further comprises:
   a negative-phase-side reference voltage generation circuit which generates a negative-phase-side reference voltage of the differential output circuit from a power supply voltage and a reference voltage of the light receiving element circuit,
   wherein the differential output circuit comprises:
   a positive-phase output-side amplification circuit having a non-inverting input terminal to which an output signal of a photoelectric conversion circuit is supplied, and an inverting terminal to which the reference voltage is supplied as the positive-phase-side reference voltage, which outputs a positive-phase-side reference voltage when the light receiving element is not irradiated with light; and
   a negative-phase output-side amplification circuit having a non-inverting input terminal to which the output signal of the photoelectric conversion circuit is supplied, and an inverting terminal to which the negative-phase-side reference voltage is supplied, which outputs a predetermined voltage higher than the positive-phase-side reference voltage when the light receiving element is not irradiated with the light.

2. The light receiving element circuit according to claim 1, wherein the reference voltage is supplied to the light receiving element circuit from an external source, and the current-voltage conversion circuit converts the current into the voltage on the basis of the reference voltage supplied from the external source, and outputs the reference voltage, when the light receiving element is not irradiated with the light.

3. The light receiving element circuit according to claim 1, further comprising:
   a reference voltage generation circuit which generates the reference voltage from the power supply voltage.

4. The light receiving element circuit according to claim 1, further comprising:
   a reference voltage generation circuit which generates the reference voltage from the power supply voltage;
   an input and output terminal which inputs and outputs the reference voltage; and
   a switching circuit which switches whether the reference voltage is input from an external source via the input and output terminal and used or whether the reference voltage is generated by the reference voltage generation circuit and used.

5. An optical disk drive comprising:
an optical pickup having a light converging section which converges light on a recording surface of an optical disk, a splitting section which splits the light reflected on the recording surface, and a light receiving element circuit which receives the split light and which supplies a plurality of photo detection signals;
a focusing control circuit which generates a focusing control signal to control focusing of laser light emitted from the optical pickup based on the photo detection signal;
a tracking control circuit which generates a tracking control signal to control tracking of the laser light emitted from the optical pickup; and
a data reproduction circuit which reproduces, from the photo detection signal, data recorded in the optical disk, wherein the light receiving element circuit comprises:
a plurality of light receiving elements which receive the split light, respectively, to photoelectrically convert the light;
a plurality of first amplification circuits which amplify electric signals from the light receiving elements, respectively;
a selecting section which selectively supplies one of the signals amplified by the plurality of first amplification circuits; and
a second amplification circuit which amplifies the signal output from the selecting section and which supplies the signal to an output.

6. The optical disk drive according to claim 5, wherein the light receiving element circuit further comprises:
an active setting section which sets a circuit section, among the plurality of light receiving elements, the plurality of first amplification circuits and the second amplification circuit, that is not in use to an inactive state and which sets a circuit section that is in use to an active state.

7. The optical disk drive according to claim 5, wherein the light receiving element circuit further comprises:
a state setting section which sets all or a part of the plurality of light receiving elements, the plurality of first amplification circuits and the second amplification circuit to an inactive state and which sets an output of the second amplification circuit to a high impedance, when the light receiving element circuit is not in use.

8. The optical disk drive according to claim 5, wherein the light receiving element circuit further comprises:
a signal switching circuit which generates tracking signals of mutually different systems by use of the signals amplified by the plurality of first amplification circuits.

9. The optical disk drive according to claim 5, wherein the plurality of light receiving elements photoelectrically convert the light signals carrying information and having mutually different wavelengths, respectively.

10. The optical disk drive according to claim 5, wherein each of the plurality of first amplification circuits includes a current-voltage conversion circuit which converts a current obtained from the light receiving element into a voltage,
the second amplification circuit includes a differential output circuit which amplifies an output signal of the current-voltage conversion circuit and which outputs the signal as a differential signal,
the light receiving element circuit further comprises a negative-phase-side reference voltage generation circuit which generates a negative-phase-side reference voltage of the differential output circuit from a power supply voltage and a reference voltage of the light receiving element circuit, and
the differential output circuit includes:
a positive-phase output-side amplification circuit having a non-inverting input terminal to which an output signal of a photoelectric conversion circuit is supplied, and an inverting terminal to which the reference voltage is supplied as the positive-phase-side reference voltage, which outputs a positive-phase-side reference voltage when the light receiving element is not irradiated with light; and
a negative-phase output-side amplification circuit having a non-inverting input terminal to which the output signal of the photoelectric conversion circuit is supplied, and an inverting terminal to which the negative-phase-side reference voltage is supplied, which outputs a predetermined voltage higher than the positive-phase-side reference voltage when the light receiving element is not irradiated with the light.

11. An optical head device integrated with an optical disk drive which reproduces information recorded in a recording surface of an optical disk and having a light receiving element circuit which receives light reflected on the recording surface, the light receiving element circuit comprising;
a plurality of light receiving elements which photoelectrically convert light signals carrying information, respectively;
a plurality of first amplification circuits I1 to In which amplify electric signals from the light receiving elements, respectively, wherein each of the plurality of first amplification circuits includes a current-voltage conversion circuit which converts a current obtained from the light receiving element into a voltage;
a selecting section which selectively outputs one of the signals amplified by the plurality of first amplification circuits; and
a second amplification circuit which amplifies the signal output by the selecting section and supplies the signal to an output, wherein the second amplification circuit includes a differential output circuit which amplifies an output signal of the current-voltage conversion circuit and which outputs the signal as a differential signal,
wherein the light receiving element circuit further comprises a negative-phase-side reference voltage generation circuit which generates a negative-phase-side reference voltage of the differential output circuit from a power supply voltage and a reference voltage of the light receiving element circuit, and
wherein the differential output circuit includes:
a positive-phase output-side amplification circuit having a non-inverting input terminal to which an output signal of a photoelectric conversion circuit is supplied, and an inverting terminal to which the reference voltage is supplied as the positive-phase-side reference voltage, which outputs a positive-phase-side reference voltage when the light receiving element is not irradiated with light; and
a negative-phase output-side amplification circuit having a non-inverting input terminal to which the output signal of the photoelectric conversion circuit is supplied, and an inverting terminal to which the negative-phase-side reference voltage is supplied, which outputs a predetermined voltage higher than the positive-phase-side reference voltage when the light receiving element is not irradiated with the light.

* * * * *